US011566481B2

(12) United States Patent
Chambers et al.

(10) Patent No.: US 11,566,481 B2
(45) Date of Patent: Jan. 31, 2023

(54) ROTARY VALVE WITH VALVE SEAT ENGAGEMENT COMPENSATION

(71) Applicant: HALLIBURTON ENERGY SERVICES, INC., Houston, TX (US)

(72) Inventors: Larry Chambers, Kingwood, TX (US); Neelesh Deolalikar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 410 days.

(21) Appl. No.: 16/610,849

(22) PCT Filed: Jul. 17, 2017

(86) PCT No.: PCT/US2017/042357
§ 371 (c)(1),
(2) Date: Nov. 4, 2019

(87) PCT Pub. No.: WO2019/017872
PCT Pub. Date: Jan. 24, 2019

(65) Prior Publication Data
US 2020/0056451 A1 Feb. 20, 2020

(51) Int. Cl.
*E21B 7/06* (2006.01)
*E21B 34/10* (2006.01)
(Continued)

(52) U.S. Cl.
CPC ............... *E21B 21/10* (2013.01); *E21B 7/06* (2013.01); *E21B 34/10* (2013.01); *F16K 3/314* (2013.01); *F16K 11/074* (2013.01); *F16K 31/041* (2013.01)

(58) Field of Classification Search
CPC .......... E21B 34/14; E21B 34/10; E21B 21/10; E21B 7/06; F16K 3/314; F16K 11/074; F16K 31/041
See application file for complete search history.

(56) References Cited

U.S. PATENT DOCUMENTS 5,520,255 A * 5/1996 Barr .................... E21B 7/06
175/73
6,898,150 B2 * 5/2005 Hahn .................. H04L 27/0008
367/83
(Continued)

FOREIGN PATENT DOCUMENTS

CA 2762538 6/2012
EP 1247787 10/2002
(Continued)

OTHER PUBLICATIONS

International Search Report and Written Opinion issued for International Patent Application No. PCT/US2017/042357, dated Dec. 27, 2017, 22 pages, ISA/KR.
(Continued)

*Primary Examiner* — Michael R Wills, III
(74) *Attorney, Agent, or Firm* — Kilpatrick Townsend & Stockton LLP

(57) ABSTRACT

A rotary valve can include a seat and a rotary actuator, each with a surface, the rotary actuator rotatably mounted to a housing. The surfaces can form a seal due to their engagement with an engagement force used to maintain the engagement. One biasing device can elevate pressure in a sealed volume in the valve at a constant level above an external pressure. The elevated pressure can produce a pressure differential across the rotary actuator, thereby producing at least a portion of the engagement force. Another biasing device can act between a splined hub and a mated splined shaft, thereby applying at least a portion of the engagement force through the shaft to the rotary actuator. Fluid flowing through a screen can create a pressure drop, thereby causing a pressure differential across the rotary actuator and applying at least a portion of the engagement force to the surfaces.

19 Claims, 15 Drawing Sheets

(51) Int. Cl.
*E21B 34/14* (2006.01)
*F16K 3/314* (2006.01)
*F16K 11/074* (2006.01)
*F16K 31/04* (2006.01)
*E21B 21/10* (2006.01)

(56) References Cited

U.S. PATENT DOCUMENTS

| | | | | |
|---|---|---|---|---|
| 8,672,056 B2* | 3/2014 | Clark | ............... | E21B 7/062 |
| | | | | 175/45 |
| 8,708,064 B2* | 4/2014 | Downton | ............... | E21B 7/062 |
| | | | | 175/45 |
| 9,016,400 B2* | 4/2015 | Clausen | ............... | E21B 17/1014 |
| | | | | 175/73 |
| 9,121,223 B2* | 9/2015 | Niina | ............... | F16K 11/0746 |
| 9,624,767 B2* | 4/2017 | Sitka | ............... | E21B 47/18 |
| 11,008,810 B2* | 5/2021 | Winslow | ............... | F16K 11/074 |
| 2008/0000693 A1* | 1/2008 | Hutton | ............... | E21B 7/064 |
| | | | | 175/73 |
| 2010/0025116 A1* | 2/2010 | Hutton | ............... | E21B 7/064 |
| | | | | 175/76 |
| 2011/0017469 A1 | 1/2011 | Malone | | |
| 2012/0186878 A1* | 7/2012 | Eddison | ............... | E21B 4/14 |
| | | | | 175/57 |
| 2013/0220623 A1 | 8/2013 | Alhaug et al. | | |
| 2014/0014413 A1* | 1/2014 | Niina | ............... | E21B 3/00 |
| | | | | 175/76 |
| 2014/0262525 A1 | 9/2014 | Fuller et al. | | |
| 2014/0307527 A1 | 10/2014 | Sitka | | |

FOREIGN PATENT DOCUMENTS

GB 2486811 6/2012
WO WO2011/087608 A1 7/2011

OTHER PUBLICATIONS

Examination Report issued by the Canadian Patent Office regarding related Canadian Patent Application No. 3,063,848, dated Feb. 12, 2021, 11 pages.
Supplemental European Search Report issued for EP Application No. 17918047.6, dated Nov. 18, 2020, 9 pages, The Hague.

* cited by examiner

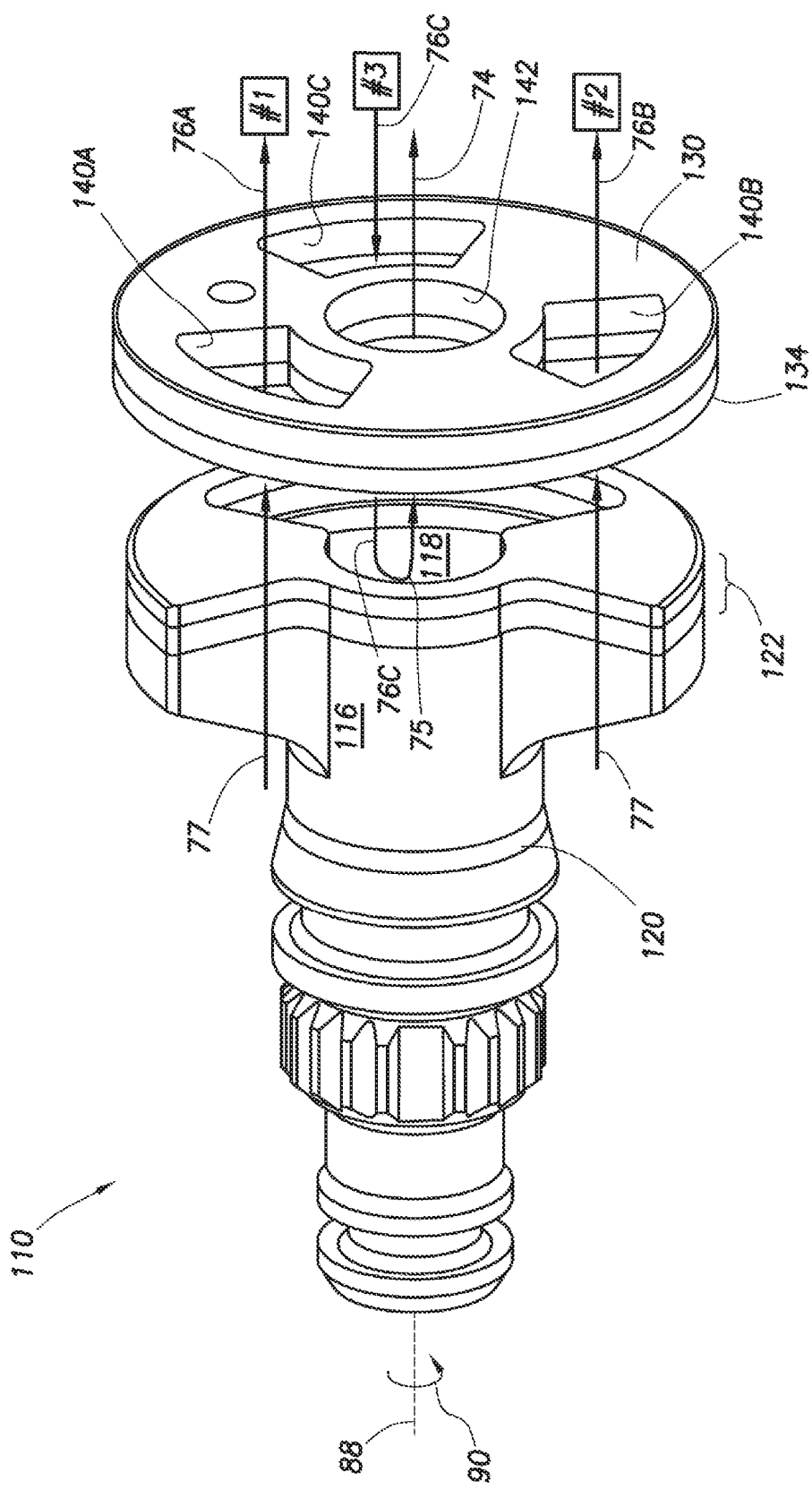

ROTARY VALVE WITH VALVE SEAT ENGAGEMENT COMPENSATION

CROSS-REFERENCE TO RELATED APPLICATION

The present application is a U.S. National Stage patent application of International Patent Application No. PCT/US2017/042357, filed on Jul. 17, 2017, the benefit of which is claimed and the disclosure of which is incorporated herein by reference in its entirety.

TECHNICAL FIELD

The present disclosure generally relates to oilfield equipment and, in particular, to downhole tools, drilling and related systems and enhancing a resistance to degradation of downhole tools due to corrosion, erosion, as well as other forms of degradation, such as chemical degradation, dissolution, etc. More particularly still, the present disclosure relates to methods and systems for protecting diamond-based material from fracturing due to impacts during installation and operation, where the diamond-based material is used to reduce a degradation rate of the downhole tool and/or components of the downhole tool.

BACKGROUND

Drilling wellbores in a subterranean formation usually requires controlling a trajectory of the drill bit as the wellbore is extended through the formation. The trajectory control can be used to steer the drill bit to drill vertical, inclined, horizontal, and lateral portions of a wellbore. In general the trajectory control can direct the drill bit into and/or through production zones to facilitate production of formation fluids, direct the drill bit to drill a portion of a wellbore that is parallel to another wellbore for treatment or production assist, direct the drill bit to intersect an existing wellbore, as well as many other wellbore configurations. A valve can be used to selectively activate actuators, thereby steering the drill bit, but the valve can be highly susceptible to degradation due to flow of abrasive fluids through the valve, caustic environment, erosive/corrosive agents, and various other modes of degradation. These valves can be manufactured from a material with increased hardness and decreased rate of degradation, but materials of this type, such as diamond based materials, can be more brittle and can be damaged by impacts during operation and/or installation.

Therefore, it will be readily appreciated that improvements in the arts of protecting components from damage due to impacts and other events are continually needed.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which:

FIGS. 5A-5D are representative perspective views of the valve seat and rotary actuator of FIG. 4 with the rotary actuator rotated to various positions relative to the valve seat with resulting fluid flow through the rotary valve indicated by flow arrows for each rotational position;

DETAILED DESCRIPTION OF THE DISCLOSURE

Figure 1:
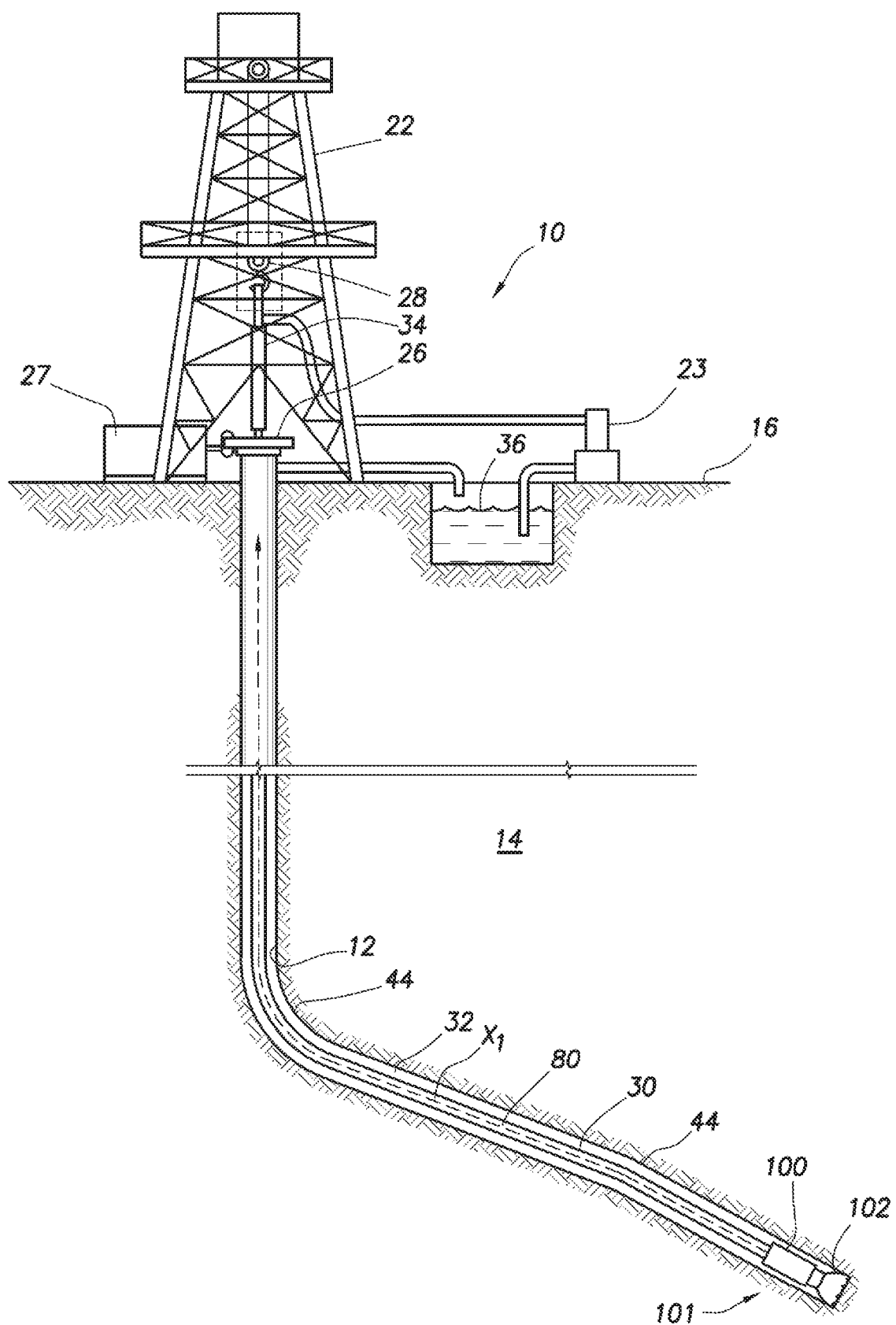
FIG. 1 is a representative partial cross-sectional view of an onshore well system including a downhole tool illustrated as part of a tubing string in accordance with an example embodiment of the disclosure.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an onshore operation, it should be understood by those skilled in the art that the method and/or system according to the present disclosure is equally well suited for use in offshore operations and vice-versa.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. It should also be understood that, as used herein, "first," "second," and "third," are assigned arbitrarily and are merely intended to differentiate between two or more objects, etc., as the case may be, and does not indicate any sequence. Furthermore, it is to be understood that the mere use of the word "first" does not require that there be any "second," and the mere use of the word "second" does not require that there be any "first" or "third," etc.

As used herein, the term "degradation" and all of its grammatical variants (e.g., "degrade," "degradable," "degrading," "dissolve," dissolving," "dissolvable," "corrode," "corrodible," "corrosion," "erode," "erosion," and the like) refers to the deterioration of an integrity of an object (or component) made from a solid material by reducing the mass of the solid object by at least one of a sliding friction between the solid object and other solid objects, an abrasive fluid flowing against parts of the solid object, a hydrolytic degradation, chemical reactions (including electrochemical and galvanic reactions), thermal reactions, or reactions induced by radiation that can degrade the solid object. In some instances, the degradation of the material may be sufficient for the mechanical properties of the material of the solid object to be reduced to a point that the material no longer maintains its integrity and, in essence, causes the solid object to no longer perform its intended purpose.

The terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

Generally, this disclosure provides a rotary valve that can include a housing and a manifold with multiple flow paths, where the manifold is mounted to the housing. A rotary actuator with a first surface can be rotatably mounted within the housing, and a valve seat with a second surface can be fixedly attached or otherwise coupled to the manifold, where the second surface can sealingly engage the first surface to form a seal. It should be understood that the first and second surfaces are defined as being the surfaces that engage each other when the rotary actuator engages the valve seat. The sealing surfaces can be rotationally fixed to the respective rotary actuator and valve seat, but are not required to be fixedly attached to either surface. As used herein, the rotary actuator comprises the first engagement surface, whether a component with the first engagement surface is attached to the rotary actuator or not. The component with the first engagement surface can be rotationally fixed to the rotary actuator, but it is not required that the component with the first engagement surface be fixedly attached to the rotary actuator. As used herein, the valve seat comprises the second engagement surface, whether a component with the second engagement surface is attached to the valve seat or not. The component with the second engagement surface can be rotationally fixed to the valve seat, but it is not required that the component with the second engagement surface be fixedly attached to the valve seat. As used herein, the "first and second" engagement surfaces are surfaces that form a seal between the rotary actuator and the valve seat. The rotary actuator can include a gap that selectively aligns with respective ones of valve seat ports as the rotary actuator rotates relative to the valve seat, thereby selectively pressurizing one or more actuators. A system and method are also provided which can include a rotary valve that selectively causes pads to extend at a predetermined orientation in the wellbore to steer a drill bit. The azimuthal orientation of a rotary actuator of the valve can determine which pads are extended and which are retracted as the drill bit rotates. The system and method provides various configurations to create a biasing force to maintain engagement between the rotary actuator and the valve seat.

FIG. 1 shows a representative elevation view in partial cross-section of an onshore well system 10 which can include a drilling rig 22 (or derrick) at the surface 16 used to extend a tubing string 30 into and through portions of a subterranean earthen formation 14. The tubing string 30 can carry a drill bit 102 at its end which can be rotated to drill through the formation 14. A bottom hole assembly (BHA) 101 interconnected in the tubing string 30 proximate the drill bit 102 can include components and assemblies (not expressly illustrated in FIG. 1), such as, but not limited to, logging while drilling (LWD) equipment, measure while drilling (MWD) equipment, a bent sub or housing, a mud motor, a near bit reamer, stabilizers, and other downhole instruments. The BHA 101 can also include a downhole tool 100 that can provide steering to the drill bit 102, mud-pulse telemetry to support MWD/LWD activities, stabilizer actuation through fluid flow control, and/or near bit reamer control through fluid flow control. Steering of the drill bit 102 can be used to facilitate deviations 44 as shown in FIGS. 1 and 2, and/or steering can be used to maintain a section in a wellbore 12 without deviations, since steering control can also be needed to prevent deviations in the wellbore 12.

At the surface 16, the drilling rig 22 can be provided to facilitate drilling the wellbore 12. The drilling rig 22 can include a turntable 26 that rotates the tubing string 30 and the drill bit 102 together about the longitudinal axis X1. The turntable 26 can be selectively driven by an engine 27, and selectively locked to prohibit rotation of the tubing string 30. A hoisting device 28 and swivel 34 can be used to manipulate the tubing string 30 into and out of the wellbore 12. To rotate the drill bit 102 with the tubing string 30, the turntable 26 can rotate the tubing string 30, and mud 36 can be circulated downhole by mud pump 23. The mud 36 may be a calcium chloride brine mud, for example, which can be pumped through the tubing string 30 and passed through the downhole tool 100. In some embodiments, the downhole tool 100 may be a rotary valve operable to impart pressure pulses in the mud 36, which can be detected at the surface 16 as will be appreciated by those skilled in the art. In other embodiments, the downhole tool 100 can include a rotary valve that selectively applies pressure to multiple output flow paths to control various pistons or other hydraulically actuated components. Additionally, the mud 36 can be pumped through a mud motor (not expressly illustrated in FIG. 1) in the BHA 101 to turn the drill bit 102 without having to rotate the tubing string 30 via the turntable 26.

The mud 36 can be expelled through openings (not shown) in the drill bit 102 to lubricate the drill bit 102, and returned to the surface 16 through an annulus 32 defined between the tubing string 30 and the earthen formation 14. Each of the components (including downhole tool 100) that is exposed to the mud 36 flow can be susceptible to degradation (e.g. corrosive and abrasive wear). According to embodiments of this disclosure, surfaces that are more prone to degradation due to interaction with the flow of the drilling mud 36 (or other potentially abrasive fluids) can be protected by a barrier material that can retard a degradation rate of the components, thereby extending the life of the downhole tool 100. As used herein, "mud 36" or "drilling mud 36" refers to a liquid that flows in the wellbore, whether it flows through a drill string, a treatment string, a work string, production string, the annulus, etc. Therefore, "mud 36" or "drilling mud 36" can include fluid that flows through a tubing string during drilling, treatment, fracturing, production, or other well system operations. Drilling mud 36 can be used to flow through a drill string, exiting through a drill bit, and returning in the annulus. Additionally, drilling mud can indicate fluid flowing from the surface through a tubing string for treatment and/or fracturing operations. Therefore, "drilling mud 36" or "mud 36" is not limited to a fluid used for drilling wells.

Figure 2:
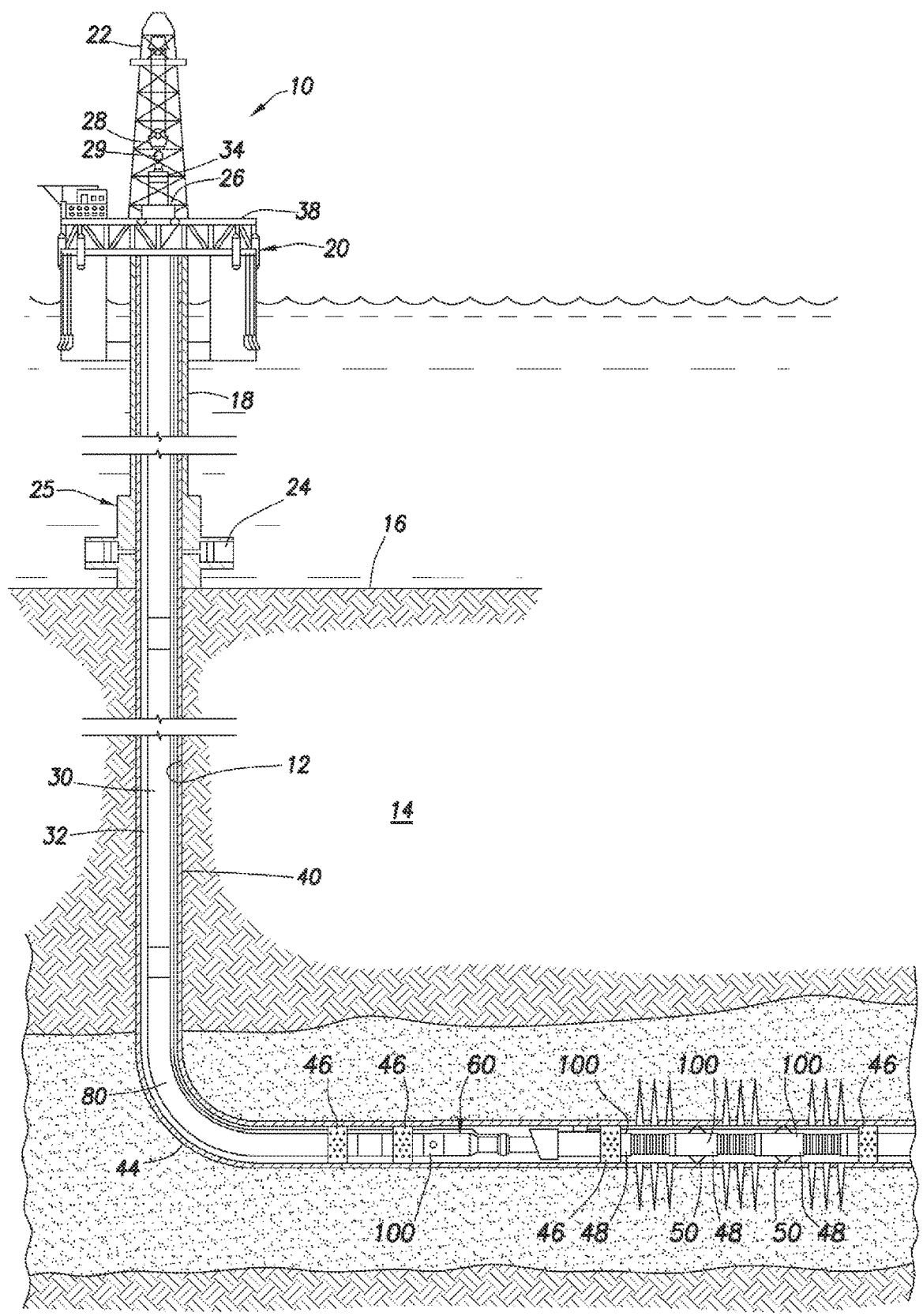
FIG. 2 is a representative partial cross-sectional view of a marine-based well system with one or more downhole tools in accordance with example embodiment(s) of the disclosure.

FIG. 2 shows a representative elevation view in partial cross-section of an offshore well system 10 which can include a drilling rig 22 (or derrick) mounted to a semi-submersible platform 20 which can be floating in a body of water above a sea floor (or surface) 16. The offshore well system 10 is shown configured to produce formation fluid. It should be understood that the well system 10 can also be used initially to drill the wellbore 12, as well as perform completion operations such as wellbore 12 treatment operations, fracturing operations, and other production operations. For the production configuration, shown in FIG. 2, a completion assembly 60 can be installed in the wellbore 12. A subsea conduit 18 can extend from a deck 38 of the platform 20 to a subsea wellhead 25, including blowout preventers 24. The platform 20 can have a hoisting device 28, a travel block 29, and a swivel 34 for raising and lowering pipe strings, such as a substantially tubular, axially extending tubing string 30, which can be referred to as a "production string" in this configuration.

A wellbore 12 can extend through the earthen formation 14 and can have a casing string 40 cemented therein. The completion assembly 60 may be positioned in a substantially horizontal portion of the wellbore 12. The completion assembly 60 can include one or more screen assemblies 48, and various other components, such as one or more packers 46, one or more centralizers 50, etc. Additionally, each screen assembly 48 can include one or more downhole tools 100, which can be flow control devices for managing fluid flow into or out of the tubing string 30 through the screen assemblies 48. All of these components can be subject to degradation due to abrasive materials that can be carried by a fluid flowing through the annulus and/or the tubing string 30. The downhole tools 100 (such as flow control devices) can be more susceptible to degradation caused by abrasive and/or caustic fluid, since the tools 100 can cause fluid flow restrictions and flow redirections. Creating any increased impingement of the fluid on surfaces of the tool 100 can increase the degradation of the tool 100. The degradation of the tools 100 can be significantly reduced by protecting surfaces of the tool 100 with a material that has an increased resistance to the degradation, such diamond based materials.

Figure 3A:
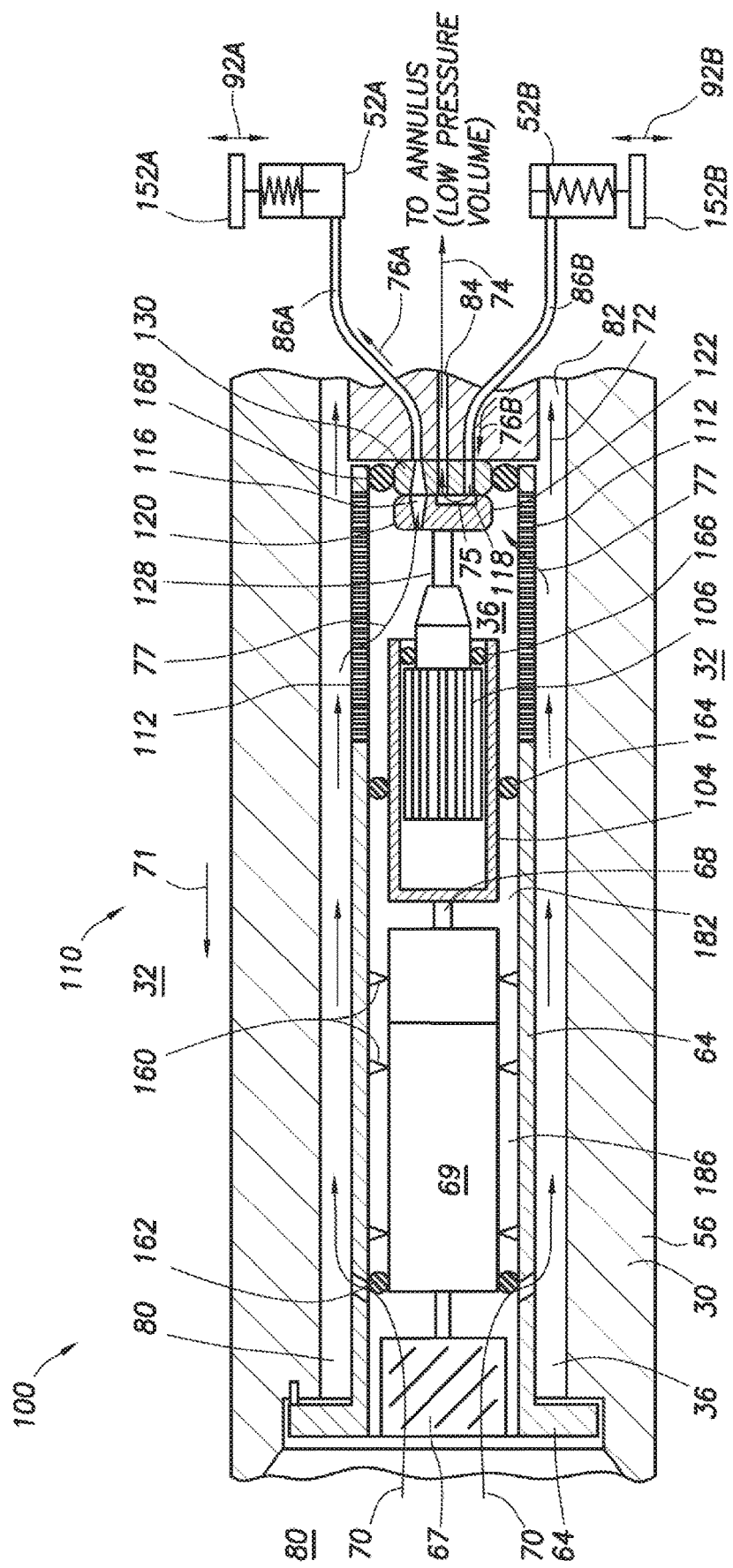
FIG. 3A-3B are representative cross-sectional views of example embodiments of the downhole tool of FIG. 1 with a turbine-driven motor/generator to control a rotary valve.

FIG. 3A shows an example of a downhole tool 100 interconnected in tubing string 30 that can selectively activate one or more hydraulic actuators. The downhole tool 100 can include a rotary valve 110 with a rotary actuator 120 that is engaged with a valve seat 130. An end 122 of the actuator 120 engages the valve seat 130 while the actuator 120 is rotated relative to the valve seat 130 by the motor 69. The motor 69 can be any suitable device that can control rotation of the rotary actuator 120, such as a mud motor, electric motor, turbine motor, actuator, etc. FIG. 3A shows a turbine-driven motor/generator 69 with a drive shaft 68 coupled to the actuator 120 via a splined hub 104 which is mated to a splined shaft 106. The splined shaft 106 can be attached to the support structure 128 on which the end 122 is mounted. Therefore, rotating the drive shaft 68 can rotate the rotary actuator 120 relative to the valve seat 130.

Figure 3B:
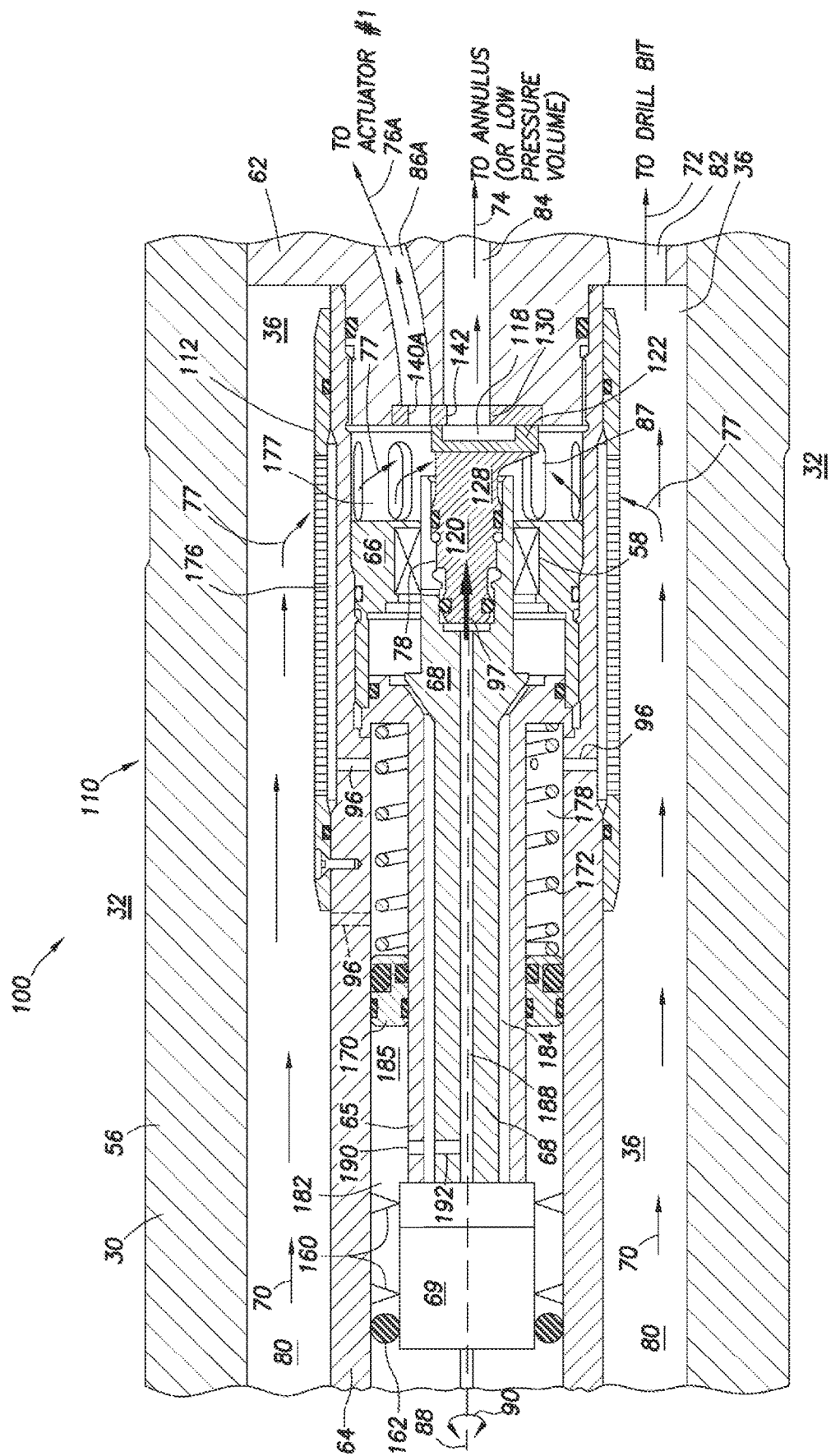

The motor 69 can be mounted within a valve housing 64 via supports 160, with the valve housing 64 mounted within the tool housing 56 as shown. This can couple the motor 69 to the valve seat 130 via the valve housing 64, since a manifold 62 is attached to the valve housing 64 and the tool housing 56. The valve seat 130 can be fixedly attached or otherwise coupled to the manifold 62 which can permanently align ports in the valve seat 130 with flow paths in the manifold 62. Therefore, these elements (tool housing 56, valve housing 64, motor 69 chassis, valve seat 130 and manifold 62) rotate with the drill bit 102. The motor 69 can rotate the drive shaft 68 relative to the valve housing 64, thereby rotating the rotary actuator 120 relative to the valve seat 130. It should be noted that the rotary actuator 120 and valve seat 130 are held in engagement with each other by an engagement force 97 (FIG. 3B).

Seals 162, 166, and compensation piston 164 can seal off a volume 182 within the valve housing 64 that can contain clean oil 186 for lubricating moving parts of the rotary valve 110 contained within the volume. The clean oil can be separated from the drilling mud 36 by the seals 162, 166, and the compensation piston 164 to prevent damage of drive components (e.g. motor 69, hub 104, shaft 106) due to degrading elements in the drilling mud (e.g. abrasive particulates, corrosive agents, caustic chemicals). The seal 162 can be a stationary seal that seals between the motor 69 housing and the valve housing 64. The compensation piston 164 can seal between the housing 64 and the splined hub 104 that rotates relative to the housing 64. However, the compensation piston 164 can also rotate with the splined hub 104 while maintaining a seal with the valve housing 64 that does not rotate with the hub 104. The compensation piston 164 can also provide pressure equalization between the volume 182 and the drilling mud 36 by providing pressure communication between the volume 182 and the mud 36. The compensation piston 164 can also refer to a compensation piston 170 in FIG. 3B. The seal 166 can rotate with the hub 104 and shaft 106 when the drive shaft 68 rotates and can seal between the splined hub 104 and the splined shaft 106.

The seals 162, 166, and the compensation piston 164 create the fluid isolated volume 182 that can contain the clean oil 186.

Fluid flow 70 of the mud 36 can flow through a turbine 67, thereby causing the turbine 67 to rotate. The rotation of the turbine 67 can generate electricity to power an electric drive for rotating the drive shaft 68. The turbine can also provide rotation of the drive shaft 68 directly and/or through various other motor 69 configurations to control the rotary valve 110. As the drive shaft 68 rotates, the splined hub 104 coupled to the splined shaft 106 transfers the rotational motion of the drive shaft 68 to rotational motion of the rotary actuator 120. As the rotary actuator 120 rotates relative to the valve seat 130, a gap 116 and recess 118 selectively align with flow paths 86A, 86B (and 86C or more if applicable). FIG. 3A shows the gap 116 aligned with the flow path 86A, which allows the pressurized drilling mud 36 to enter the flow path 86A via a port in the valve seat 130, thereby pressurizing the actuator #1 (shown as piston 52A) to extend an extendable pad 152A. A second flow path 86B can be aligned with the recess 118 which can direct fluid flow 76B from the flow path 86B to be released to the annulus 32 (or other low pressure volume) via flow path 84 as fluid flow 74, thereby deactivating the actuator #2 (shown as piston 52B) and retracting the pad 152B. As the rotary actuator 120 rotates, the gap 116 can miss-align from the flow path 86A and align with flow path 86B, thereby pressurizing the piston 52B to extend the pad 152B, and allowing the actuator #1 (or piston 52A) to depressurize via the recess 118 and the flow path 84 to the annulus 32, thereby retracting the pad 152A. The selective activation of the pistons 52A, 52B (and 52C or more if applicable) selectively extends and retracts the pads 152A, 152B (and 152C or more if applicable). The operation of the rotary valve is discussed in more detail with reference to FIGS. 4 and 5A-5D.

FIG. 3B shows another example embodiment of a downhole tool 100 interconnected in tubing string 30 that can selectively activate one or more hydraulic actuators. It should be clear that the rotary valve 110 shown can also be used to create pressure pulses in the drilling mud 36 for communicating to the surface, as well as other flow control functions. However, this example is directed to selectively activating hydraulic actuators, even though pressure pulses may also be created as the rotary valve selects and de-selects various hydraulic actuators.

The downhole tool 100 can include a rotary valve 110 with a rotary actuator 120 that is engaged with a valve seat 130 (similar to the one in FIG. 3A). An end 122 of the actuator 120 engages the valve seat 130 as the actuator 120 is rotated relative to the valve seat 130 by the motor 69. The end 122 and/or the valve seat 130 can be manufactured from a material (such as Silicon Carbide Diamond ScD) that provides better resistance to degradation than if the components were made from materials such as tungsten carbide, steel, metal alloys, etc. By increasing the life of the rotary actuator 120 and valve seat 130, the life of the downhole tool 100 can also be extended.

The valve seat 130 can be fixedly attached or otherwise coupled to a flow manifold 62, which can have multiple flow paths for directing fluid flow received from the valve seat 130. The flow paths can direct fluid flow to various tool actuators, to the drill bit, to the annulus, to other chambers, and/or other locations in the downhole tool 100 or BHA 101. The manifold 62 can be fixedly attached to the tubing string 30 via the housing 56, such as by welding, brazing, threaded connections, etc. such that the manifold 62 rotates with the tubing string 30 when the drill bit 102 rotates. This allows ports that may be formed in the tubing string 30 (or housing 56) to remain aligned with one or more of the flow paths of the manifold 62, such as a flow path through the manifold 62 to the annulus 32 through a wall of the tubing string 30.

The cylindrical housing 64 can support the rotary valve 110 components. Ports 87 allow fluid flow 77 through the housing 64 from an interior flow passage 80 of the tubing string 30 to the rotary actuator 120 and valve seat 130. The housing can be fixedly attached to the manifold 62, such that it rotates with the tubing string 30 and the valve seat 130. A motor 69 can be mounted within the housing 64 to rotate (direction 90 indicated by the arrows) a drive shaft 68 about a central axis 88 relative to the housing 64. Rotation of the drive shaft will rotate the rotary actuator 120 relative to the valve seat 130, thereby selectively enabling and disabling fluid flow through ports 140A-C in the valve seat 130. A bearing seat 66 can be used to mount a rotary bearing 58 that rotationally mounts the drive shaft 68 to the housing 64 and helps keep the rotary actuator 120 centered within the housing. A screen 112 can be positioned around an outer surface of the housing 64 to filter drilling mud 36 that passes through the screen 112 into the rotary valve 110. This screen 112 can prevent objects carried by the mud 36 from damaging the rotary valve 110, flow paths, and/or actuators controlled by the rotary valve.

A portion 77 of the fluid flow 70 of the drilling mud 36 can enter the rotary valve 110 through the screen 112 and through ports 87. The remaining portion of the fluid flow 70 can travel through the bypass flow path 82 as fluid flow 72 to continue on to the drill bit 102. As seen in FIG. 3, the rotary actuator 120 is in a rotated position that allows fluid flow 77 to enter the flow path 86A in the manifold 62 as fluid flow 76A. The fluid flow 76a can then be directed by the flow path 86A to an actuator #1, such as an actuator of components of the downhole tool 100 and/or an actuator of another downhole tool. The developed pressure in the actuator #1 due to fluid and pressure communication through the rotary valve 110 can be released when the rotary valve 110 rotates to a different position that prevents fluid and pressure communication through the rotary valve 110 to the flow path 86A. The developed pressure can be vented through the rotary valve 110 via the flow path 84 as fluid flow 74, which can be directed to a low pressure volume such as the annulus 32. This allows the actuator #1 to be deactivated.

The drive shaft 68 can be positioned concentrically within an extended motor housing 65, and configured to rotate within the motor housing 65. An annular space 184 can be formed between the drive shaft 68 and the motor housing 65. The drive shaft 68 can also include a center flow passage 188 that can communicate the pressure in the oil 186 to the rotary actuator 120. If pressure in the oil 186 is greater than the pressure of the mud 36 in a chamber 177 (through which fluid flow 77 travels), then a pressure differential across the rotary actuator 120 can create an engagement force 97 that urges engagement of the rotary actuator 120 with the valve seat 130. Pressure equalization ports 190 and 192 maintain equal pressure within the sealed volume 182 by allowing pressure communication between an annular space 185, an annular space 184, and the central flow passage 188. Therefore, pressure of the oil 186 in the sealed volume 182 remains equalized, and the pressure exerted on the left side (relative to the FIG. 3B) of the rotary actuator 120 (and rotary bearing 58) equals the pressure in the annulus 185.

The downhole tool 100 of FIG. 3B is similar to the downhole tool 100 of FIG. 3A, in that is also includes a motor 69 with supports 160, a valve housing 64, a screen 112, a manifold 62, a rotary actuator 120 and valve seat 130, as well as the flow paths and actuators described in reference to FIG. 3A. However, the tool 100 of FIG. 3B differs from FIG. 3A at least by including a biasing device 172 that provides a compensating force to the oil 186 in the isolated volume 182. The biasing device 172 is shown as a coiled spring, but other biasing devices can be used, such as compression rings, and any other suitable biasing device that can produce a constant compensation pressure in the oil 186, where the compensation pressure is added to the pressure external the isolated volume 182. It should be clear that a biasing device 172 can also be used in the tool 100 of FIG. 3A, in keeping with the principles of this disclosure.

A compensation piston 170 can communicate pressure between a chamber 178 and the annular space 185, while preventing fluid communication between them. As pressure changes in the annular space 185 or the chamber 178, the compensation piston 170 can move along the motor housing 65 to compensate for any pressure changes, thereby equalizing the pressure in the space 185 with the pressure in the chamber 178, assuming that the biasing device 172 was not present. At least a couple of options are given in FIG. 3B for establishing the pressure in the chamber 178. Equalization ports 96 can be positioned at various locations in the valve housing 64 to establish the pressure in the chamber 178. An annular space 176 is shown as an annular space between the screen 112 and the valve housing 64. The ports 96 shown as solid lines can provide pressure equalization between the annular space 176 and the chamber 178. The pressure in the annular space 176 equals the pressure in the chamber 177 due to the ports 87 in the valve housing 64. Therefore, with this positioning of the ports 96, the pressure in the chamber 178 can be equalized with the pressure in the annular space 176 and the chamber 177. Alternatively, one or more ports 96 can be positioned in the valve housing 64 so as to provide pressure communication between the flow passage 80 and the chamber 178. In this configuration, the ports 96 with the solid lines are removed and the port 96 illustrated with dashed lines can be formed in the valve housing outside of the screen 112. Therefore, the pressure in chamber 178 is equalized with the pressure in the flow passage 80 of the tubing string 30.

Therefore, without the biasing device 172, the pressure of the oil 186 would be maintained at the pressure of the drilling mud 36 in the flow passage 80 (using port 96 with dashed lines) or equal to the pressure in the annular space 176 (using ports 96 with solid lines). It should also be understood, that the pressure in the chamber 178 is equal to the pressure in the flow passage 80 regardless of the position of the ports 96 when the rotary valve 110 is at the surface, or when fluid is not flowing through the rotary valve 110, since the pressure can equalize between the chamber 178, the flow passage 80, the annular space 176, and the chamber 177, that is, if the biasing device 172 is not provided.

However, if the biasing device 172 is provided, then the pressure of the oil 186 can be maintained at a pressure that is the pressure in the chamber 178 plus a compensation pressure K (see FIGS. 10 and 11). This compensation pressure K can provide a positive engagement force 97 to maintain engagement of the rotary actuator 120 and the valve seat 130 during assembly at the surface of the valve 110 and drill string 30, installation into the wellbore 12, and downhole operation of the rotary valve 110. The biasing device 172 can be configured to provide a desired compensation pressure K in the oil 186, thereby providing a desired engagement force 97 to protect the actuator 120 and valve seat 130 from damage due to impacts that can be caused when the actuator 120 is moved away from the valve seat 130 and then engages the valve seat 130 again with an impact to the engagement surfaces 138, 132 of the actuator 120 and valve seat 130, respectively. However, the biasing device 172 is not required to produce the desired engagement force 97.

Figure 4:
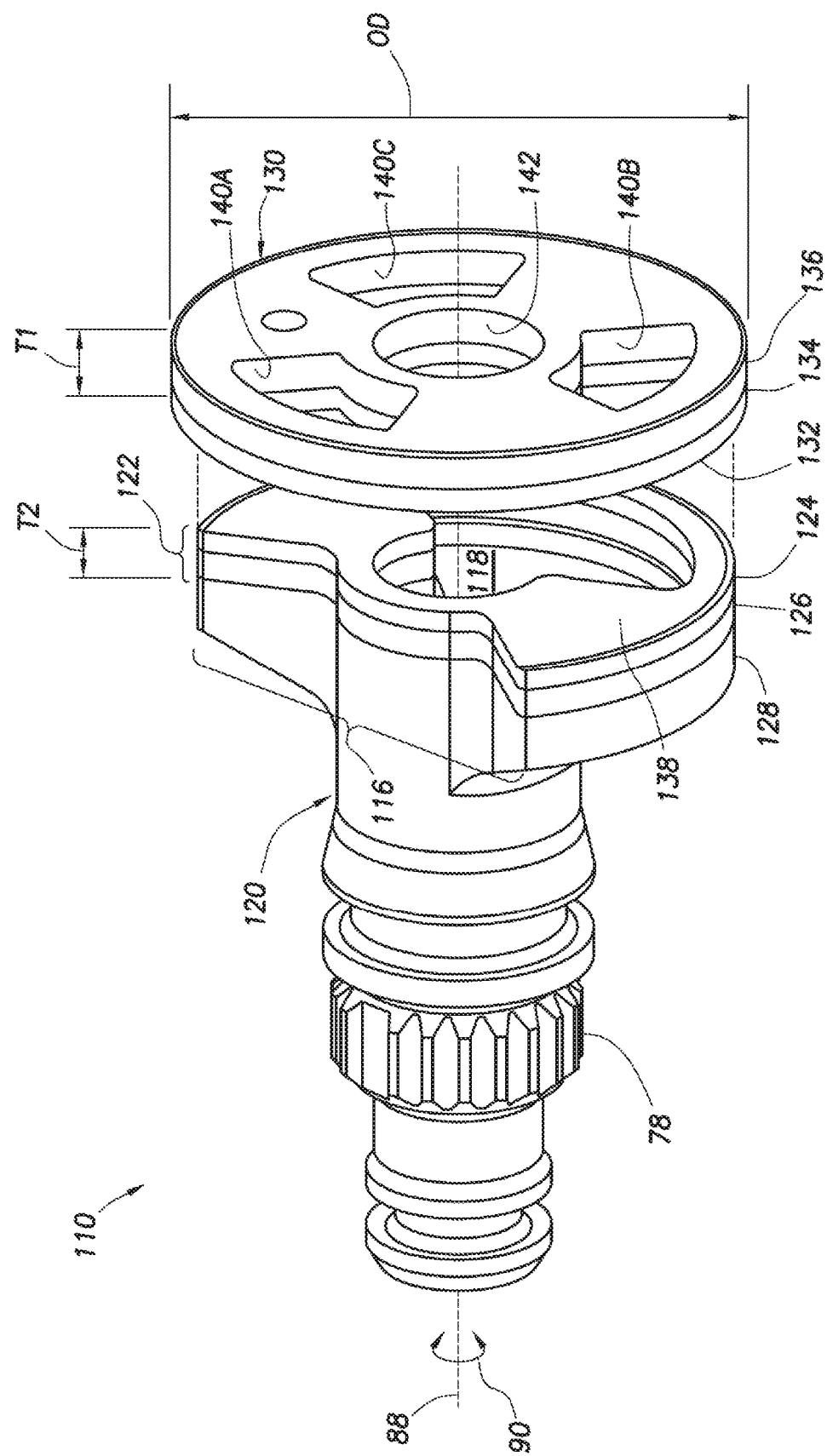
FIG. 4 is a representative perspective view of components of the rotary valve of FIG. 3 illustrating an exploded view of an example valve seat and rotary actuator.

FIG. 4 shows a perspective view of the rotary actuator 120 and the valve seat 130 of the rotary valve 110 without the other components of the rotary valve 110 for clarity. Also, the actuator 120 and valve seat 130 are shown separated by a space between surfaces 138 and 132. However, in operation the surfaces 138 and 132 sealingly engage each other to form a seal. The rotary actuator 120 can rotate in either direction 90 about the center axis 88. The splines 78 can be coupled to the drive shaft 68 (e.g. via the splined hub 104 and splined shaft 106, where the splined shaft can include the splines 78) and used to rotate the rotary actuator 120. The end 122 of the actuator 120 can be formed as a cylinder with a gap 116 formed in the circumference of the cylinder and a recess 118 formed in the surface 138 of the end 122. The recess 118 can extend through the end 122 and further into the main body of the actuator 120, if desired. A structure 128 of the main body of the actuator 120 can be used to support the end 122, which can be made up of layers 124, 126. Layer 124 can be made from a degradation resistant material (or materials) to reduce the degradation rate of the rotary actuator 120. The degradation to the actuator 120, and in particular to the end 122, can be caused by fluid flowing through the rotary valve 110 as well as engagement forces experienced by the surface 138 of the actuator 120 and the surface 132 of the valve seat 130. It should be understood that the end 122 can be made from a single layer of a degradation resistance material without there being two individual layers 124, 126. The two layers may be needed when a layer 126 (or substrate) is used to support a degradation resistant material layer 124, such as Polycrystalline Diamond PCD. The single layer configuration can be used when Silicone Carbide Diamond ScD is used as the degradation resistant material.

The valve seat 130 of this rotary valve 110 can be made up of layers 134, 136. Layer 134 can be made from a degradation resistant material (or materials) to reduce the degradation rate of the valve seat 130. Similarly, the degradation to the valve seat 130 can be caused by fluid flowing through the rotary valve 110 as well as engagement forces experienced by the surfaces 138 and 132. It should be understood that the valve seat 130 can be made from a single layer of a degradation resistance material (e.g. ScD) without there being two individual layers 134, 136. The two layers may be needed when a layer 136 (or substrate) is used to support a degradation resistant material layer 134, such as Polycrystalline Diamond PCD. The valve seat 130 can include ports 140A-C and 142 for fluid flow control with each of these ports associated with one or more flow paths in the manifold 62.

The operation of the valve 110 shown in FIG. 4 is illustrated by FIGS. 5A-5D. These figures show various rotational positions of the rotary actuator 120 relative to the valve seat 130. The following discussion discloses at least how this embodiment of the rotary valve 110 operates to selectively supply and receive fluid flow through the ports 140A-C and 142 of the valve seat 130. Ports 140A-C can be associated with actuators #1, #2, and #3, respectively, through flow paths in the manifold 62 (not shown in FIGS. 5A-5D).

Figure 5A:
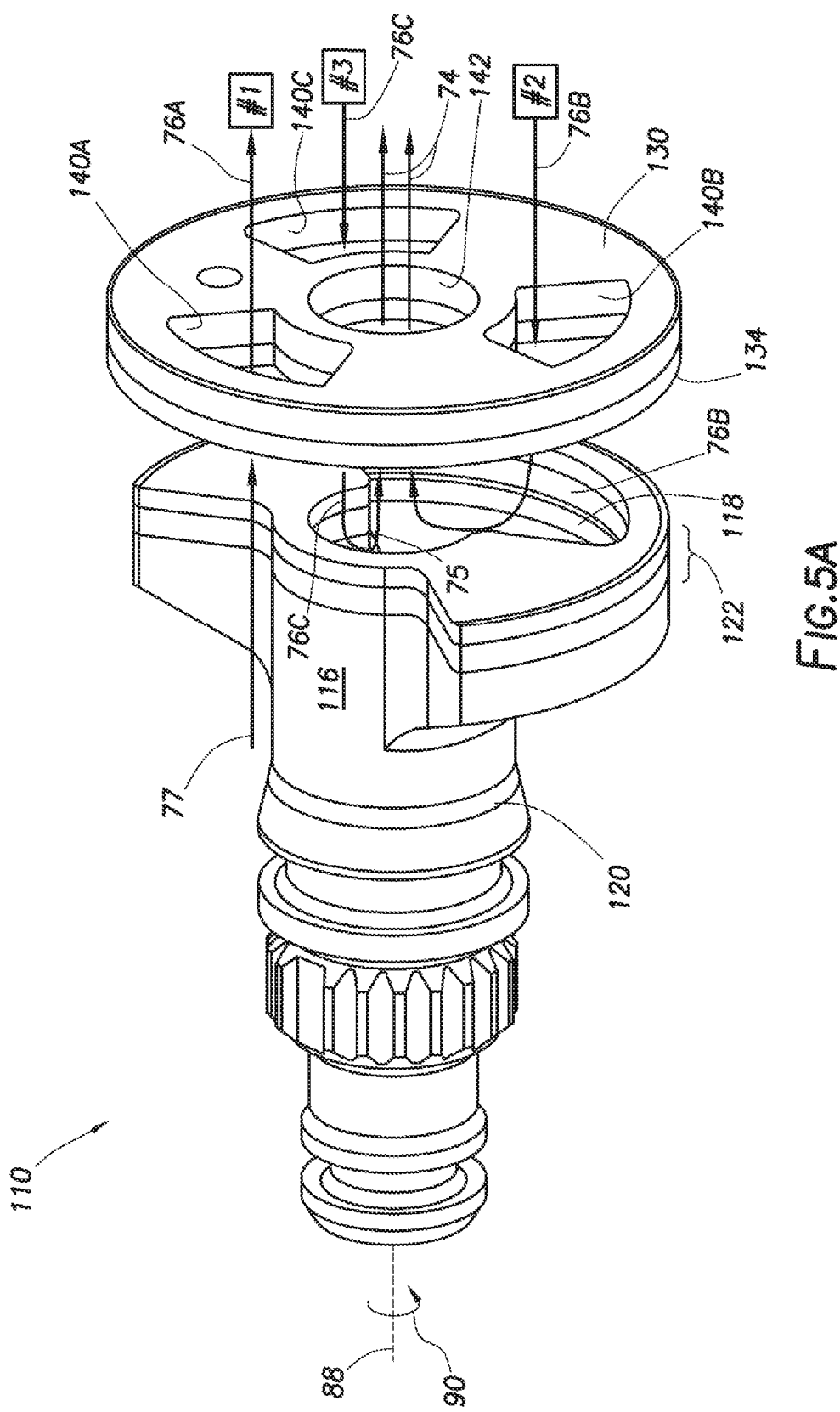

FIG. 5A shows the rotary actuator 120 rotated such that the gap 116 is aligned with the port 140A, and at least a portion of the recess 118 is aligned with the ports 140B, 140C, and port 142. The port 142 remains aligned with a portion of the recess 118 that is centered on the central axis 88. Fluid flow 77 that has traveled through the screen 112 and ports 87 can pass through the port 140A as flow 76A, and be directed by the manifold 62 to an actuator #1. The flow 76A can pressurize the actuator #1 and thereby activate the actuator #1. However, fluid flow 77 is prevented from flowing through ports 140B, 140C, since the rotary actuator 120 is blocking these ports from the fluid flow 77.

Through previous revolutions of the rotary actuator 120, actuators #2 and #3 could have been pressurized through ports 140B and 140C, respectively, via fluid flow 76B and 76C, respectively. Therefore, with ports 140B and 140C at least partially aligned with the recess 118, the pressure in the actuators #2 and #3 can be released by fluid flows 76B and 76C as indicated by arrows showing fluid flows 76B, 76C flowing back through the ports 140B, 140C into the recess 118. These fluid flows 76B, 76C can be diverted by the recess 118 (shown as U-shaped arrows 75) into port 142 as fluid flow 74 and directed by the manifold 62 into the annulus 32 (or any other low pressure volume), thereby releasing the pressure in the actuators #2, #3. Accordingly, port 142 may also be referred to as a drain port 142. However, if no pressure was built up in the actuators #2 and #3, then fluid flows 76B, 76C would be minimal if any at all.

FIG. 5B shows the actuator 120 rotated further in the direction 90 such that port 140B is no longer aligned with the recess 118. However, port 140C remains aligned with recess 118, allowing pressure equalization of the actuator #3 with the low pressure volume (e.g. the annulus 32) by fluid flow 76C through port 140C, into recess 118 which redirects the fluid flow 76C (indicated by U-shaped arrow 75) into the drain port 142 as fluid flow 74, which can be directed to the annulus 32 by the manifold 62. Ports 140A, 140B are at least partially aligned with the gap 116, allowing fluid flow 77 to enter both ports, thereby pressurizing and activating the actuators #1 and #2.

Figure 5C:
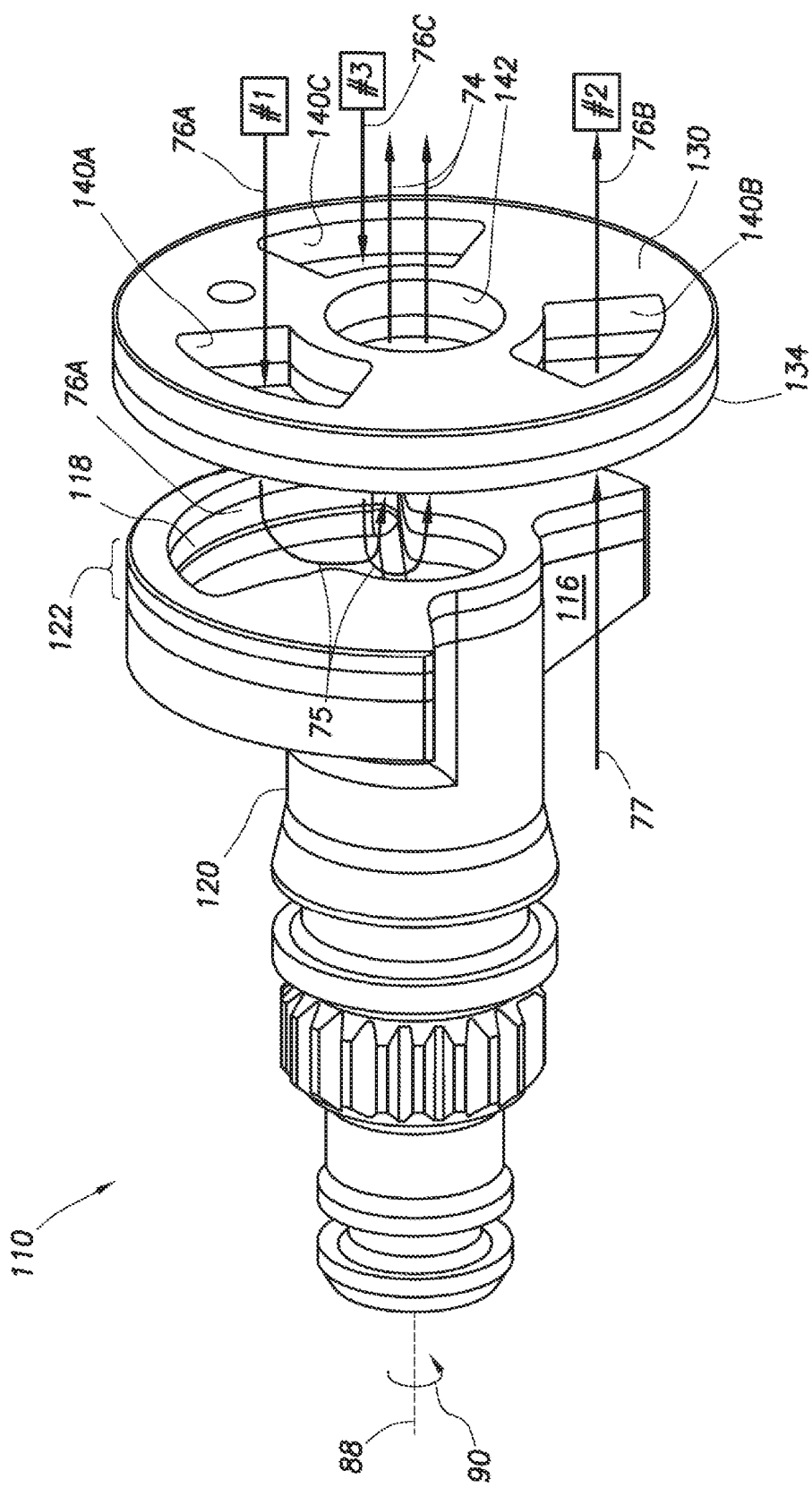

FIG. 5C shows the actuator 120 rotated further in the direction 90 such that ports 140A, 140C are at least partially aligned with the recess 118, allowing pressure in actuators #1 and #3 to be released by fluid flows 76A, 76C through ports 140A, 140C, respectively, into recess 118 which redirects the fluid flows 76A, 76C (indicated by U-shaped arrows 75) into port 142 as fluid flow 74, which is directed to the annulus 32 by the manifold 62. Port 140B is fully aligned with the gap 116, allowing fluid flow 77 to enter the port, thereby continuing to pressurize actuator #2.

Figure 5D:
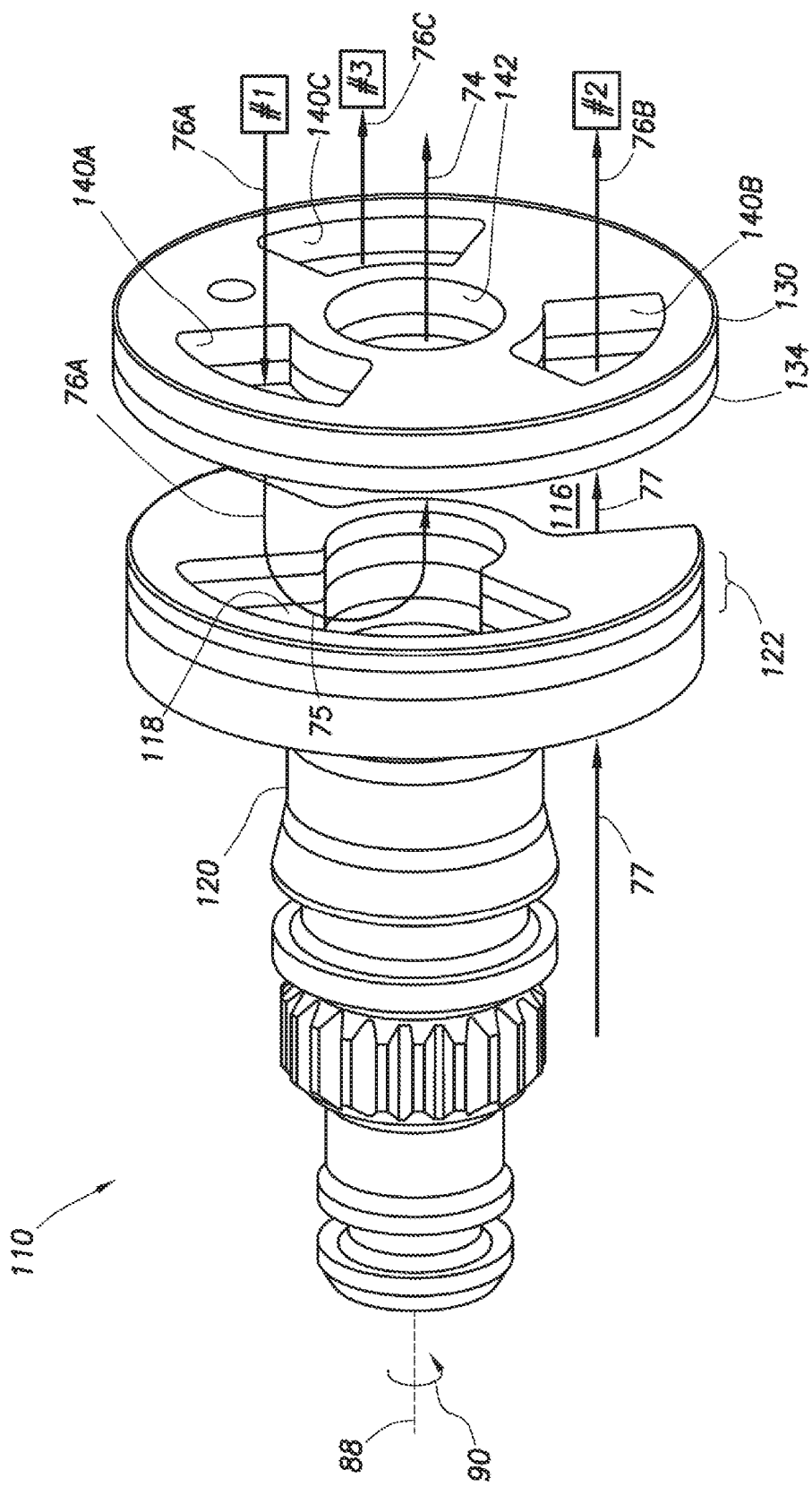

FIG. 5D shows the actuator 120 rotated further in the direction 90 such that port 140A is aligned with the recess 118, allowing pressure in actuator #1 to be further released by fluid flow 76A through port 140A into recess 118 which redirects the fluid flow 76A (indicated by U-shaped arrow 75) into drain port 142 as fluid flow 74, which is directed to the annulus 32 by the manifold 62. Ports 140B, 140C may be at least partially aligned with the gap 116, allowing fluid flow 77 to enter both ports, thereby pressurizing the actuators #2, #3. As the rotary actuator 120 continues to rotate these configurations (as well as other intermediate configurations) of the rotary valve 110 can be repeated until the actuator 120 is no longer rotated.

Figure 6:
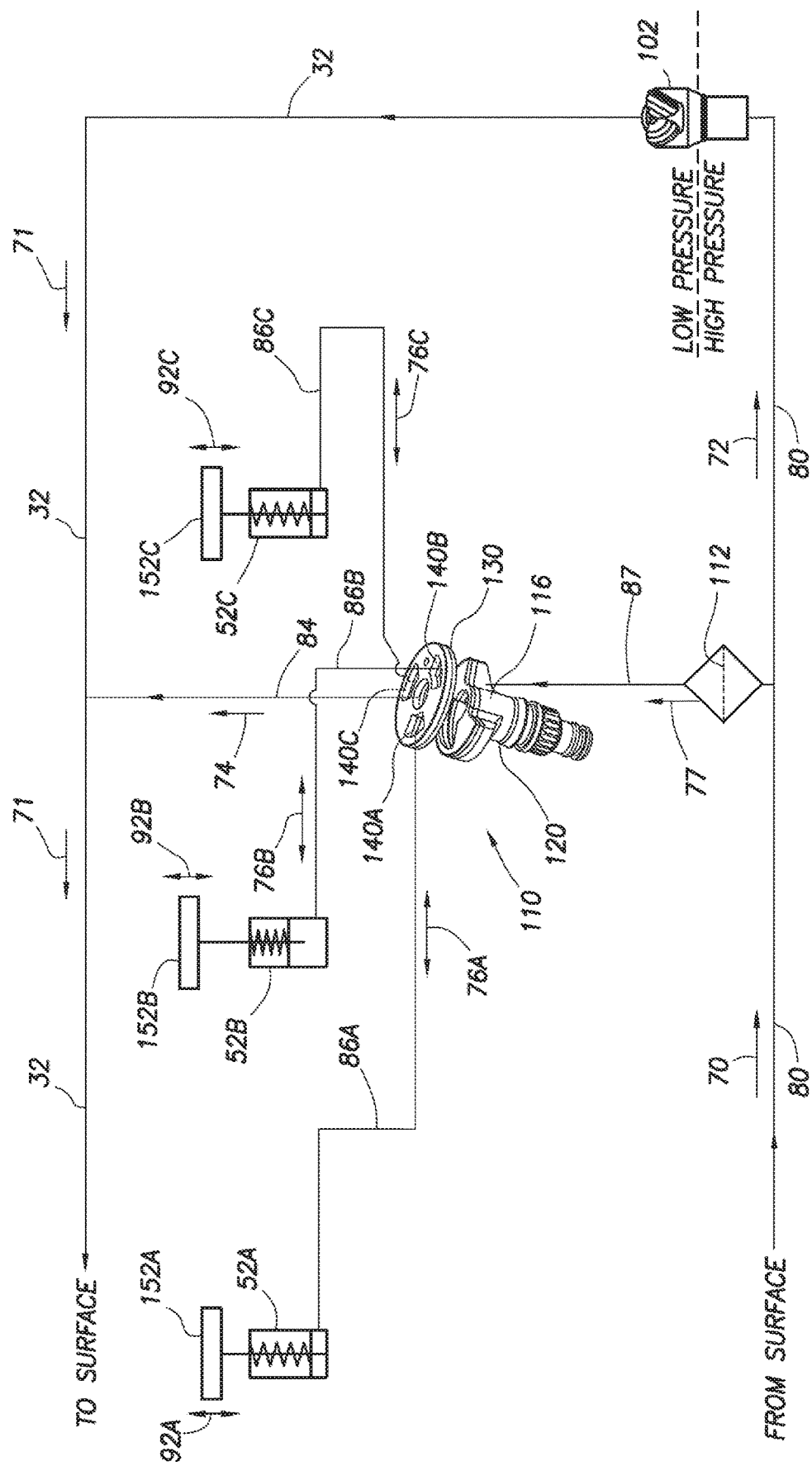
FIG. 6 is a schematic representation of a hydraulic circuit that utilizes the rotary valve of FIG. 4 to selectively actuate a plurality of pistons in a downhole tool.

FIG. 6 shows a schematic diagram of an example rotary valve 110 (that can include similar components as shown in FIG. 4) being used to selectively activate and deactivate actuators #1, #2, #3 which are shown as pistons 52A-C, respectively. However, other rotary valves 110 can be substituted for the rotary valve 110 and more or fewer pistons can be supported by this configuration shown in FIG. 6. The rotary valve 110 can be used to synchronize pad extensions of a downhole tool 100 with rotation of the drill bit 102 and to facilitate steering of the drill bit 102 via selective pad extensions.

Drilling mud 36 can be pumped from the surface 16 as fluid flow 70 through the tubing string 30 via the interior flow passage 80. This mud 36 can be referred to as a "high" pressure side of the system. Some of the fluid flow 70 of the mud can be diverted as flow 77 to supply fluid and pressure to the rotary valve 110, with the remainder (and majority) of the mud 36 flowing to the drill bit 102 as fluid flow 72 under "high" pressure. The diverted flow 77 can pass through a screen 112 to filter any debris or other objects from the fluid before it enters the rotary valve 110.

As the mud 36 flows through the drill bit 102 and into the annulus 32, the mud 36 can experience a pressure drop across the drill bit 102. Therefore, the annulus 32 can be referred to as a "low" pressure side of the system. The rotary valve 110 can be connected between the "high" pressure side and the "low" pressure side as shown in FIG. 6. Fluid flow 77 can enter the rotary valve 110 from the "high" pressure side via the ports 87 (not shown) and the gap 116 to selectively pressurize actuators #1, #2, #3, and then exit the rotary valve 110 to the "low" pressure side via the port 142 which is in fluid communication with the annulus 32 (a low pressure volume) via flow path 84. These pistons 52A-C can be connected to ports 140A-C via flow paths 86A-C, respectively. As the rotary actuator 120 is rotated, the pistons 52A-C are selectively activated and deactivated.

When the gap 116 is aligned with port 140A, then pressure can be applied to flow path 86A and thereby activate piston 52A. When the gap 116 is aligned with port 140B, then pressure can be applied to flow path 86B and thereby activate piston 52B, with the pressure in piston 56A being released through the drain port 142 into flow path 84 as fluid flow 74, which can be dumped into the annulus 32 (or another low pressure volume) where it can join the mud flow 71 flowing back to the surface 16. When the gap 116 is aligned with port 140C, then pressure can be applied to flow path 86C and thereby activate piston 52C, with the pressure in pistons 56A, 56B being released through the drain port 142 into flow path 84 as fluid flow 74, which can be dumped into the annulus 32 where it can join the mud flow 71 flowing back to the surface 16. This sequence can continue as long as the rotary actuator 120 continues to rotate relative to the valve seat 130. As can be seen in FIG. 6, the gap 116 is shown as being aligned with the port 140B which allows pressure to be applied to the piston 52B through the flow path 86B. The piston 52B is shown extended in the chamber of the piston 52B with the piston 52B extending the pad 152B radially to contact an interior surface (or wall) of the wellbore 12.

In one example, the rotary valve 110 can be used to steer the drill bit 102 as the drill bit spins to extend the wellbore 12. The pistons 52A-C can be used to extend and retract the guidance pads 152A-C, respectively, that can be circumferentially spaced apart on an exterior of the tubing string 30 (or housing 56). As these guidance pads 152A-C are selectively extended into contact with the wellbore 12, the tubing string 30 can be pushed away from the wellbore wall contacted by an extended pad and pushed toward an opposite wellbore wall. If selected guidance pads 152A-C are periodically extended, then the drill bit 102 can be guided in an azimuthal direction away from the longitudinal axis X1 to change the trajectory of the drill bit 102 through the earthen formation 14 as the wellbore 12 is extended. To periodically extend the guidance pads 152A-C at a desired azimuthal orientation relative to the wellbore 12, the guidance pad extensions can be synchronized with the rotation of the tubing string 30 by using the rotary valve 110 to control the extensions and retractions of the extendable guidance pads 152A-C.

With the housing 56 rotating at a given RPM, then the motor 69 can be controlled to rotate the drive shaft 68 (and therefore the rotary actuator 120) at the given RPM but in an opposite direction. Therefore, the rotary actuator 120 can be seen as "geostationary" compared to the earthen formation 14 and the wellbore 12. As the drill bit 102 rotates, the rotary actuator 120 can rotate relative to the valve seat 130 (which rotates with the drill bit 102 and housing 56). Once the actuator 120 is set to a desired azimuthal orientation relative to the wellbore 12 by the motor 69, then the motor 69 can maintain that orientation relative to the wellbore 12 as the drill bit 102 rotates by rotating the actuator 120 in the opposite direction at the same speed of the drill bit 102. As the valve seat 130 rotates with the drill bit 102, it will present the ports 140A-C in sequence to the gap 116 of the rotary actuator 120, thereby pressurizing the associated piston 52A-C when individual ports 140A-C align with the gap 116.

As each individual port 140A-C misaligns from the gap 116, it will align with a recess 118 in the rotary actuator 120 that provides fluid communication between the port aligned with the recess 118 and the drain port 142, thereby releasing pressure in the respective piston 52A-C through the flow path 84 to the annulus 32. With the actuator 120 "geostationary," it can be seen that each pad extended due to alignment of the gap 116 with individual ports 140A-C, will be extended in a desired azimuthal orientation, which is determined by the azimuthal orientation of the actuator 120 relative to the wellbore 12, where the desired azimuthal orientation of the actuator 120 can be different from the desired azimuthal orientation for extending the individual pads 152A-C. In this manner, periodic pad extensions at the same desired azimuthal orientation can continue to steer the drill bit 102 in a desired azimuthal orientation (which can also be different that the other azimuthal orientations) away from the central longitudinal axis X1 of the wellbore 12.

Referring again to FIG. 4, at least one of the generally flat, disc-shaped first and second mating surfaces 138, 132 can be constructed of an ScD material for inhibiting or resisting degradation of the rotary valve 110 in operation. As illustrated, the rotary actuator 120 can be constructed with a wear surface 138 of an ScD composite that forms the end 122 (where the end 122 can be one layer of thickness "T2" instead of two layers 124, 126 as described above) and is bonded to a support structure 128. The support structure 128 may be constructed of a material, e.g., WC and/or cemented carbide that is different from the ScD composite end 122. In some embodiments, the ScD composite end 122 can be bonded to the support structure 128 by brazing techniques at brazing temperatures between 650 and 925° C. By employing furnace brazing methods and active brazing alloys, shear strengths of 250 to 350 MPa can be achievable. The ScD composite end 122 is thermally stable, at least in part because the ScD composite end 122 does not contain the interstitial cobalt (Co) catalyst present in sintered PCD. Thus, the thermal degradation due to Co thermal expansion and graphitization does not occur with brazing even at temperatures greater than 700 degrees Celsius, and the rotary actuator 120 can remain structurally stable without cracking. In some embodiments, the rotary actuator 120 can be constructed of a monolithic piece or bonded pieces of the ScD composite material.

The rotation of the rotary actuator 120 with respect to the valve seat 130 can cause frictional contact between the engagement surfaces 138, 132. Since the coefficient of friction of the ScD component may be relatively low, rotational movement between the engagement surfaces 138, 132 may be achieved with a relatively low expenditure of energy, and with relatively low abrasive wear.

The valve seat 130 can be fabricated from a monolithic piece or bonded pieces of the ScD composite material. The monolithic piece or bonded pieces can be milled to form the ports 140A-C, and the drain port 142. Therefore, the engagement surface 132 and the ports 140A-C, 142 expose the fluid flow through the valve seat 130 to surfaces made of ScD and can provide significant resistance to degradation of the valve seat 130. The valve seat 130 can also be brazed using standard brazing alloys at standard brazing temperatures (e.g. temperatures greater than 650 degrees) to provide a superior bond between the valve seat 130 and the manifold 62.

Figure 7:
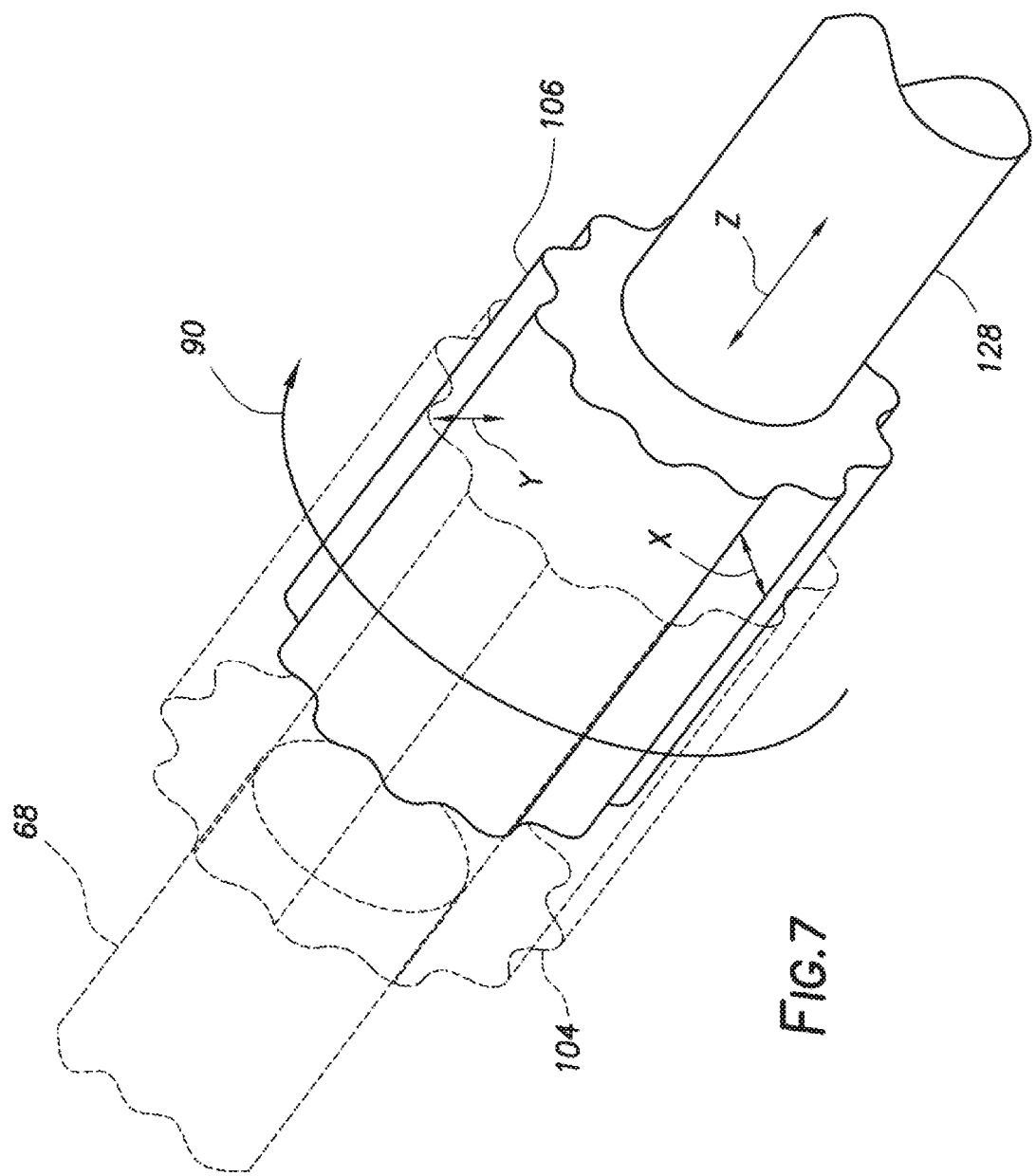
FIG. 7 is a representative perspective view of a mated splined hub and splined shaft to drive the rotary actuator of the rotary valve.

FIG. 7 shows the splined hub 104 engaged and mated with the splined shaft 106. The splined hub 104 transmits rotational movement of the drive shaft 68 to the splined shaft 106 due to the engagement of the splined hub 104 with the splined shaft 106. The engagement of the splines causes the hub 104 and shaft 106 to rotate together as a unit, while allowing lateral (i.e. longitudinal) movement of the shaft 106 relative to the hub 104. Therefore, the splined shaft 106 can move longitudinally (i.e. the Z-axis) relative to the splined hub 104. The splined interface allows enough freedom of longitudinal movement for the rotary actuator 120 (structure 128 of actuator 120 shown) to self-adjust to relative motion of the valve seat 130.

Figure 8:
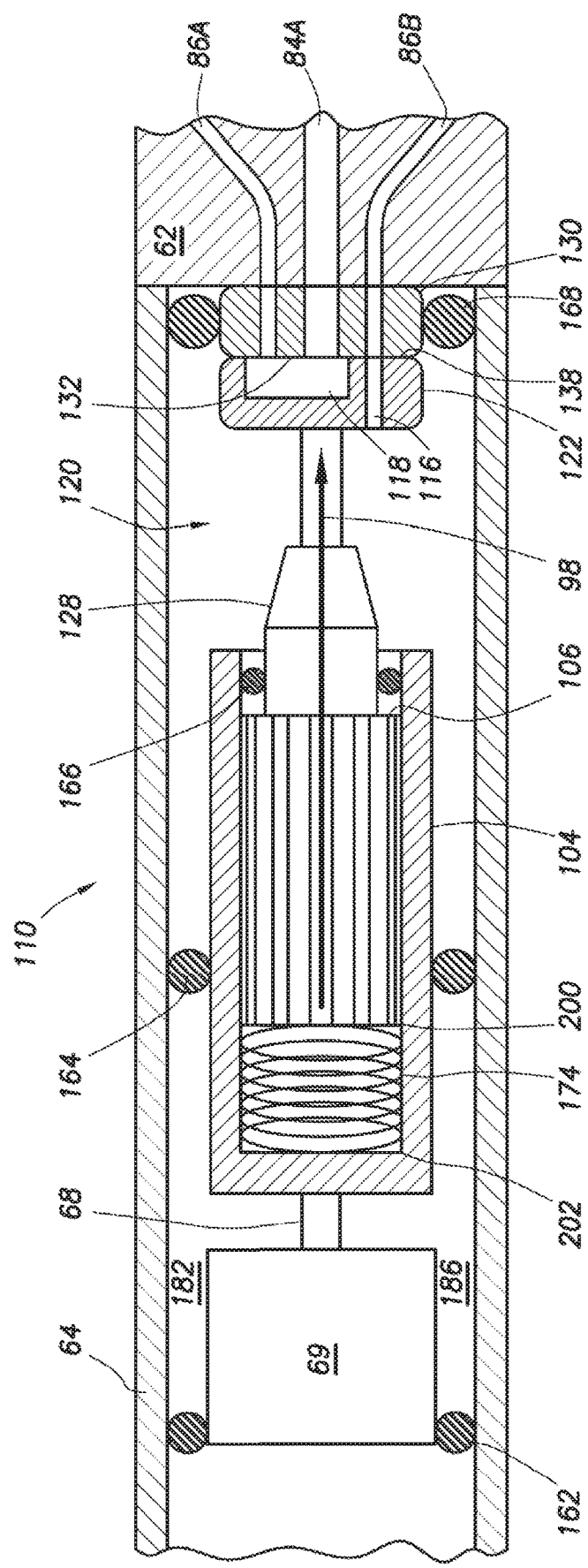
FIG. 8 is a representative cross-sectional view of another example embodiment of the downhole tool of FIGS. 3A-3B with a biasing device used to bias the rotary actuator into engagement with the valve seat.

FIG. 8 is a simplified partial cross-sectional view of a rotary valve 110 similar to the valve 110 shown in FIG. 3A. However, FIG. 8 has a biasing device 174. It should be understood, that this biasing device 174 can also be used in the rotary valves shown in FIGS. 3A and 3B as well as other rotary valve 110 embodiments. The biasing device 174 can be positioned between an end 200 of the splined shaft 106 and an interior shoulder 202 of the splined hub 104. The biasing device 174 can apply a force 98 to the splined shaft 106 which can transmit the force 98 to the rotary actuator 120, thereby applying the force 98 to the rotary actuator 120 to urge the surface 138 into engagement with the surface 132 on the valve seat 130. This engagement force 98 can also maintain an engagement of the surface 138 with the surface 132 during assembly of the valve 110 and/or drill string 30 at the surface 16, installation of the valve 110 into the wellbore 12, and downhole operation of the valve 110. The biasing device 172 is shown as a coiled spring, but other biasing devices can also be used, such as compression rings, expandable foam, and any other suitable biasing device that can produce the force 98 against the splined shaft 106 and the engagement surface 138. It should be understood that the force 98 in FIG. 8 can also include the force 97 produced by the biasing device 172 when the drive shaft 68 has the center flow passage 188 (see FIG. 3B) through which the fluid pressure in the sealed volume 182 can be applied to the shaft 106. The sealed volume 182 can contain the clean oil 186.

Figure 9:
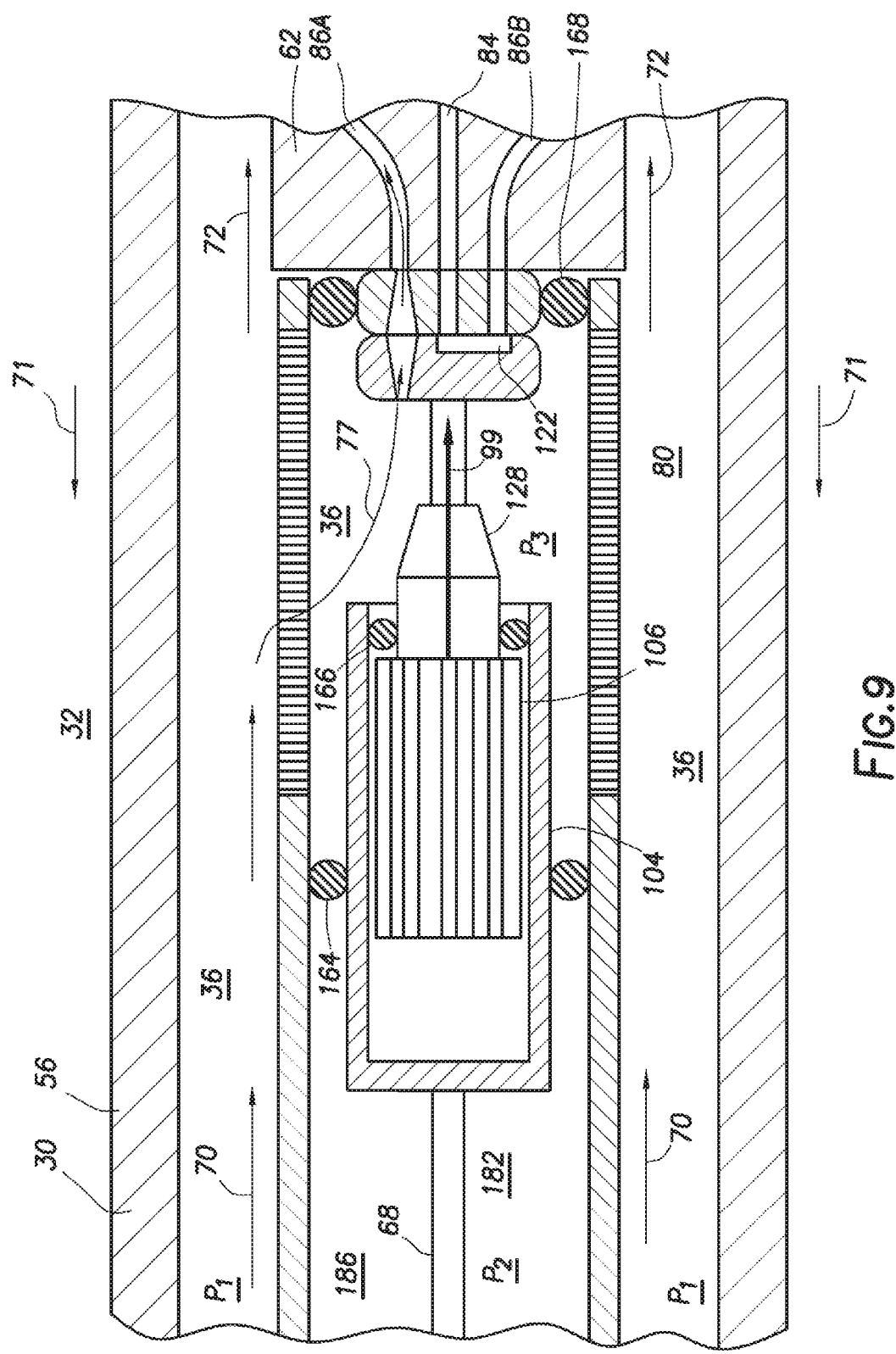
FIG. 9 is a representative cross-sectional view of another example embodiment of the downhole tool of FIGS. 3A-3B with a pressure differential used to bias the rotary actuator into engagement with the valve seat.

FIG. 9 illustrates yet another way to apply an engagement force (here shown as engagement force 99) to the rotary actuator 120 to maintain engagement between the rotary actuator 120 and the valve seat 130 when pressurized fluid is flowing through the rotary valve 110. With the flow passage 80 in pressure communication with the sealed volume 182, pressure P2 in the sealed volume will be equal to the pressure P1 in flow passage 80, via the compensation piston 170 and the port 96 (i.e. the dashed port 96 in FIG. 3B). Therefore, the pressure P1 equals P2, with P2 being applied to a left side (relative to the figure) of the splined shaft 106. A portion of the drilling mud 36 enters the rotary valve 110 through the screen 112 as fluid flow 77. The screen 112 (or filter) can create a pressure drop in the drilling mud across the filter resulting in a pressure P3 in the chamber 177 that is less than the pressure P1 in the flow passage 80. This pressure P3 can be applied to the right side (relative to the figure) of the splined shaft 106 from the chamber 177, thereby creating a pressure differential across the splined shaft 106, since P3 is less than P2. As way of an example, if P1 is 1000 psi, then P2 would be 1000 psi due to the pressure equalization between the flow passage 80 and the sealed volume 182. If the pressure drop across the screen 112 was 50 psi, then the pressure P3 in the chamber 177 would be 950 psi. The pressure differential across the splined shaft 106 would also be 50 psi, since P2-P3 is 50 psi in this example. The pressure values presented here are merely stated to help illustrate the operation of producing the force 99 due to a pressure differential across the splined shaft 106.

As can be seen, there are at least three different ways to apply an engagement force to maintain engagement of the rotary actuator 120 with the valve seat 130. One way produces the engagement force 97, due to producing the compensation pressure K in the sealed volume 182 via the biasing device 172 as described in reference to FIG. 3B. Another way produces the engagement force 98, due to the biasing device 174 that applies a biasing force to the splined shaft 106 as described in reference to FIG. 8. The third way produces the engagement force 99, due to a pressure differential between the sealed volume 182 and the chamber 177. Two or more of these engagement forces can be combined as needed to apply a desired engagement force to the rotary actuator 120.

For example, the biasing device 172 can be employed without the additional biasing device 174. During assembly of the drill string 30 at the surface and installation of the drill string in the wellbore 12, the force 97 can maintain an engagement of the rotary actuator 120 with the valve seat 130. After drilling begins and mud 36 is being pumped through the drill string 30, then the additional engagement force 98 (due to pressure differential across the splined shaft 106) can be combined with the force 97 to maintain engagement of the rotary actuator 120 with the valve seat 130. Additionally, the biasing device 174 can also be utilized which can produce the engagement force 99, thereby applying an engagement force to the rotary actuator 120 that combines the forces 97, 98, and 99. Additionally, if neither biasing device 172, 174 were utilized, then the pressure differential across the splined shaft can provide the engagement force 99 when the rotary valve 110 has pressurized fluid flowing through it. However, with this configuration fluid flow through the valve 110 is required to produce the pressure differential across the rotary actuator 120.

Figure 10A:
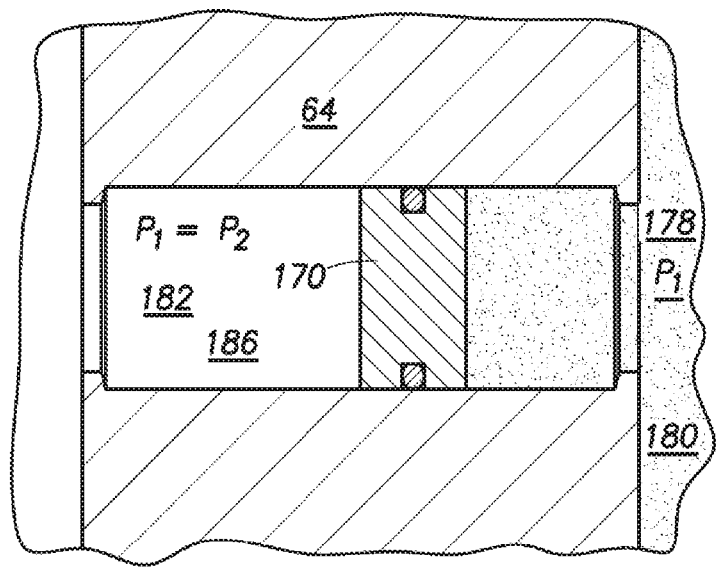
FIG. 10A is representative functional diagram of a seal that equalizes pressure across the seal when the seal is at the surface and prevents fluid communication past the seal.
Figure 10B:
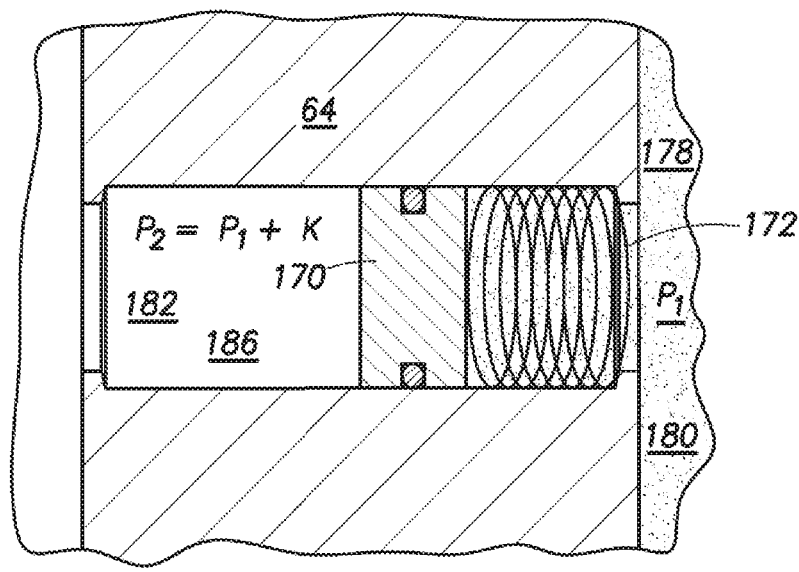
FIG. 10B is representative functional diagram of the seal with a biasing device that maintains a constant pressure differential across the seal when the seal is at the surface and prevents fluid communication past the seal.

FIGS. 10A and 10B show a simplified functional diagram to illustrate how the biasing device 172 can be used to produce the compensation pressure K at the surface 16. The compensation piston 170 that can slide in the valve housing 64 to adjust for pressure changes in either the sealed volume 182 (containing clean oil 186) or the chamber 178 (which can contain ambient air 180 at the surface 16). The compensation piston 170 provides pressure communication between the volume 182 and the chamber 178, but doesn't provide fluid communication between them. If the rotary valve 110 is at the surface (e.g. during assembly of the drill string), then the chamber 178 can be filled with air 180 at atmospheric pressure. Therefore, the pressure P1 in the chamber 178 can be atmospheric pressure at the surface 16, and since the compensation piston 170 provides pressure communication, the pressure P2 in the sealed volume 182 equals P1, with both being equal to atmospheric pressure. In FIG. 10B, the biasing device 172 has been added to the chamber 178 side of the compensation piston 170, between the compensation piston 170 and a shoulder of the valve housing 64. The biasing device 172 can provide a compensation pressure K. Therefore, the pressure P2 in the sealed volume 182 can be the compensation pressure K combined with the pressure P1. This compensation pressure K can be applied to the rotary actuator 120 to maintain engagement with the valve seat 130.

Figure 11A:
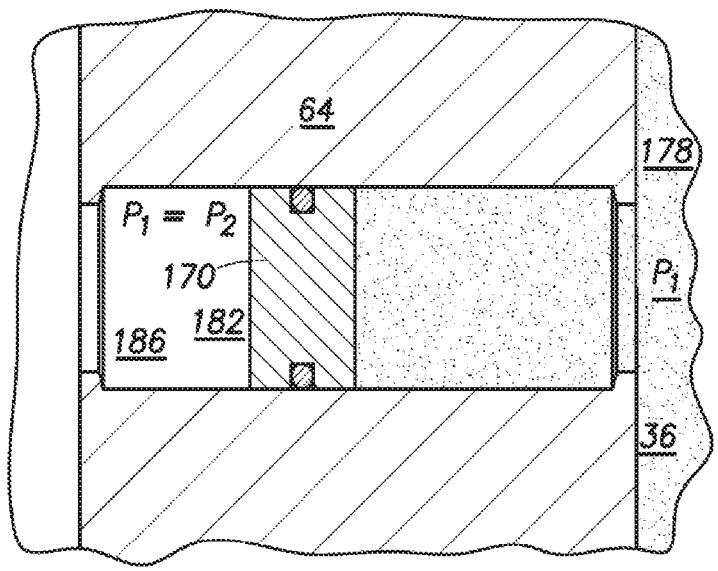
FIG. 11A is representative functional diagram of a seal that equalizes pressure across the seal when the seal is downhole and prevents fluid communication past the seal.
Figure 11B:
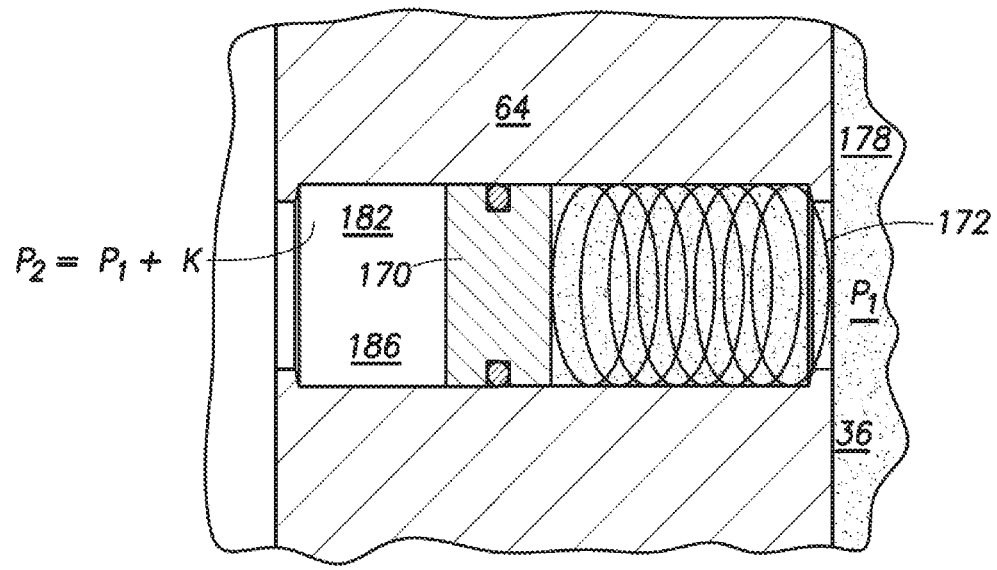
FIG. 11B is representative functional diagram of the seal with a biasing device that maintains a constant pressure differential across the seal when the seal is downhole and prevents fluid communication past the seal.

FIGS. 11A and 11B show a simplified functional diagram to illustrate how the biasing device 172 can be used to produce the compensation pressure K downhole. The compensation piston 170 that can slide in the valve housing 64 to adjust for pressure changes in either the sealed volume 182 or the chamber 178. Again, the compensation piston 170 provides pressure communication between the volume 182 and the chamber 178, but doesn't provide fluid communication between them. If the rotary valve 110 is downhole (e.g. during drilling operations), then the chamber 178 can be filled with pressurized drilling mud 36 at pressure P1, causing the pressure P2 in the sealed volume 182 to equal P1. In FIG. 11B, the biasing device 172 has been added to the chamber 178 side of the compensation piston 170, as in FIG. 10B. The biasing device 172 can provide the compensation pressure K to the sealed volume 182. Therefore, the pressure P2 in the sealed volume 182 can be the compensation pressure K combined with pressure P1. This compensation pressure K can be applied to the rotary actuator 120 to maintain engagement with the valve seat 130 downhole.

Thus a rotary valve 110 is provided that can include a valve housing 64, a manifold 62 mounted to the valve housing 64, a rotary actuator 120 rotatably mounted within the valve housing 64 with the rotary actuator 120 having a first engagement surface 138, a valve seat coupled to the manifold, and the valve seat having a second engagement surface 132 that sealingly engages the first engagement surface 138 and forms a seal between the first and second engagement surfaces 138, 132. An engagement force 97, 98, 99 can be applied to the rotary actuator 120 to maintain the engagement between the first and second engagement surfaces 138, 132.

For any of the foregoing embodiments, the valve 110 may include any one of the following elements, alone or in combination with each other:

The manifold 62 can include multiple flow paths 86A-C, the valve seat 130 can include ports 140A-C that are in fluid communication with respective ones of the flow paths 86A-C in the manifold 62, and the rotary actuator 120 can include a gap 116 that selectively aligns with respective ones of the valve seat ports 140A-C as the rotary actuator 120 rotates relative to the valve seat 130. An engagement force 97, 98, 99 can be created by at least one of a first biasing device 172, a second biasing device 174, and a pressure differential across the rotary actuator 120. At least a portion of the engagement force 97, 98, 99 can be created by the first biasing device 172 acting on a compensation piston 164, 170.

The valve 110 can include a sealed volume 182 within the valve housing 64, where the compensation piston 164, 170 can provide pressure communication between the sealed volume 182 and a first flow passage 80, 176 external to the sealed volume 182, and the first biasing device 172 acting on the compensation piston 164, 170 can create a pressure differential across between the first flow passage and the sealed volume 182 by increasing a pressure in the sealed volume 182 by a constant amount above a pressure in the first flow passage 80, 176. The increased pressure in the sealed volume 182 can create a pressure differential across the rotary actuator 120, thereby creating the portion of the engagement force 97, 98, 99. The first flow passage 80, 176 can be an internal flow passage 80 of a drill string 30.

The valve 110 can include a screen 112 configured to filter fluid flowing from an internal flow passage 80 of a drill string 30 into the rotary valve 110, wherein the first flow passage 80, 176 is a chamber 176 that is downstream from the screen 112. The screen 112 can create a pressure drop across the screen 112 when fluid flows from an internal flow passage 80 of the drill string 30 to the chamber 176 such that pressure in the chamber 176 is less than the pressure in the internal flow passage 80. The screen 112 can be configured to filter fluid flowing from a first flow passage 80 external to the rotary valve 110 into a chamber 176 in the rotary valve 110 which is downstream from the screen 112, where the screen 112 can create a pressure drop across the screen 112 when fluid flows from the first flow passage 80 into the chamber 176 such that pressure in the chamber 176 is less than the pressure in the first flow passage 80. The valve 110 can include a sealed volume 182 within the valve housing 64, where a compensation piston 164, 170 can provide pressure communication between the sealed volume 182 and the first flow passage 80, 176. The pressure drop can create the pressure differential across the rotary actuator 120, thereby creating at least a portion of the engagement force 97, 98, 99.

A portion of the engagement force 97, 98, 99 can be created by the second biasing device 174 acting on the rotary actuator 120. A motor 69 with a drive shaft 68 can be coupled to the rotary actuator 120 through engagement of a splined shaft 106 with a splined hub 104, where the splined hub 104 allows longitudinal movement of the splined shaft 106 relative to the splined hub 104, and the splined hub 104 constrains the splined shaft 106 to rotate with the splined hub 104. The second biasing device 174 can be positioned between the splined hub 104 and the splined shaft 106, and the second biasing device 174 can apply a biasing force 98 to the splined shaft 106 that urges the splined shaft 106 to displace longitudinally in the splined hub 104, thereby creating the portion of the engagement force 97, 98, 99.

An end 122 of the rotary actuator 120 can include the first engagement surface 138, where the end 122 is made from a Silicon Carbide Diamond (ScD) composite, and the engagement force 97, 98, 99 maintains engagement between the first and second engagement surfaces 138, 132 during one or more impacts to the rotary valve 110. Damage to either one of the first and second engagement surfaces 138, 132 can be prevented when contact is maintained between the first and second engagement surfaces 138, 132. The valve seat 130 can be made from a Silicon Carbide Diamond (ScD) composite, and the engagement force 97, 98, 99 can maintain contact between the first and second engagement surfaces 138, 132 during one or more impacts to the rotary valve 110.

A system for steering a drill bit 102 with a rotary valve 110 is also provided and can include a downhole tool 100 interconnected in a drill string 30, the downhole tool 100 including multiple extendable pads 152A-C that can be activated by respective actuators 52A-C, and the rotary valve 110 can selectively activate the actuators 52A-C. The rotary valve 110 can include a valve housing 64, a manifold 62, a rotary actuator 120 with a first engagement surface 138, a valve seat 130 with a second engagement surface 132, and an engagement force 97, 98, 99 applied to the rotary actuator 120, where the engagement force 97, 98, 99 can maintain engagement between the first and second engagement surfaces 138, 132, and a drill bit 102 interconnected at an end of the drill string 30, where the drill bit 102 is steered due to selective extension and retraction of the extendable pads 152A-C controlled by the rotary valve 110.

For any of the foregoing embodiments, the system may include any one of the following elements, alone or in combination with each other:

At least one of the valve seat 130 and a portion of the rotary actuator 120 can be made from a Silicon Carbide Diamond (ScD) composite.

The rotary valve 110 can include a motor 69 that controls rotation of the rotary actuator 120, thereby causing the selective extension and retraction of the extendable pads 152A-C. The motor 69 can be coupled to the rotary actuator 120 via a splined shaft 106 inserted in a splined hub 104, where the splined shaft 106 can move longitudinally within the splined hub 104.

The engagement force 97, 98, 99 can be partially created by at least one of a first biasing device 172, a second biasing device 174, and a pressure differential across the rotary actuator 120.

The rotary valve 110 can include a sealed volume 182, where the first biasing device 172 applies a compensation pressure to the sealed volume 182 and maintains the sealed volume 182 at an elevated pressure, where the elevated pressure is elevated above a flow passage 80, 176 pressure by the compensation pressure amount and the flow passage 80, 176 is external to the sealed volume 182. The sealed volume 182 can contain a motor 69 and can be filled with clean oil 186, where the clean oil 186 is maintained at the elevated pressure. The elevated pressure of the clean oil 186 can produce at least a portion of the engagement force 97, 98, 99 by creating a pressure differential across the rotary actuator 110.

The second biasing device 174 can be positioned between a splined hub 104 and a splined shaft 106, and the second biasing device 174 can act on the splined shaft 106 to produce at least a portion of the engagement force 97, 98, 99.

The fluid 77 that enters the rotary valve 110 from a flow passage 80 of the drill string 30 can pass through a screen 112 which can create a pressure drop in the fluid 77 that causes a pressure differential across the rotary actuator 120 and produces at least a portion of the engagement force 97, 98, 99.

A method of maintaining engagement between surfaces 138, 132 in a rotary valve 110 is also provided and can include assembling a rotary valve 110 in a downhole tool 100, where the rotary valve 110 can include a valve housing 64, a manifold 62, a rotary actuator 120 with a first engagement surface 138, and a valve seat 130 with a second engagement surface 132. Applying an engagement force 97, 98, 99 to the rotary actuator 120, thereby maintaining engagement between the first and second engagement surfaces 138, 132.

For any of the foregoing embodiments, the system may include any one of the following elements, alone or in combination with each other:

The rotary valve 110 can include a compensation piston 164, 170 and a sealed volume 182, where the compensation piston 164, 170 provides pressure communication between the sealed volume 182 and a flow passage 80, 176 external to the sealed volume 182. Biasing the compensation piston 164, 170 with a biasing device 172 can elevate pressure in the sealed volume 182 by a compensation pressure amount above pressure in the external flow passage 80, 176. Creating a pressure differential across the rotary actuator 120 due to the elevated pressure in the sealed volume 182 and producing at least a portion of the engagement force 97, 98, 99 due to the elevated pressure.

The rotary valve 110 can include a drive shaft 68 coupled to the rotary actuator 120 via a splined shaft 106 inserted in a splined hub 104, where a biasing device 174 can be positioned between the splined hub 104 and the splined shaft 106. At least a portion of the engagement force 97, 98, 99 can be produced by the biasing device 174.

The rotary valve 110 can include a screen 112, where fluid 77 flowing through the screen 112 creates a pressure drop in the fluid flow, and at least a portion of the engagement force 97, 98, 99 is produced by the pressure drop in the fluid flow. The engagement force 97, 98, 99 can be performed at the surface 16 and/or downhole in a wellbore 12.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. A rotary valve comprising:
a valve housing;
a manifold mounted to the valve housing;
a rotary actuator rotatably mounted within the valve housing, with the rotary actuator having a first engagement surface; and
a valve seat that is coupled to the manifold, the valve seat having a second engagement surface that sealingly engages the first engagement surface,
wherein an engagement force is applied to the rotary actuator to maintain the engagement between the first and second engagement surfaces,
wherein at least a portion of the engagement force is created by a first biasing device acting on a compensation piston.

2. The valve of claim 1, wherein the engagement force is created by at least one of a second biasing device and a pressure differential across the rotary actuator; and
wherein the manifold includes multiple flow paths, wherein the valve seat further comprises ports that are in fluid communication with respective ones of the flow paths in the manifold, and wherein the rotary actuator further comprises a gap that selectively aligns with respective ones of the valve seat ports as the rotary actuator rotates relative to the valve seat.

3. The valve of claim 2, further comprising a screen configured to filter fluid flowing from a first flow passage external to the rotary valve into a chamber in the rotary valve which is downstream from the screen, wherein the screen creates a pressure drop across the screen when fluid flows from the first flow passage into the chamber such that pressure in the chamber is less than the pressure in the first flow passage.

4. The valve of claim 3, further comprising a sealed volume within the valve housing, wherein a compensation piston provides pressure communication between the sealed volume and the first flow passage; and/or
wherein the pressure drop creates the pressure differential across the rotary actuator, thereby creating at least a portion of the engagement force.

5. The valve of claim 2, wherein at least a portion of the engagement force is created by the second biasing device acting on the rotary actuator;
further comprising a motor with a drive shaft coupled to the rotary actuator through engagement of a splined shaft with a splined hub, wherein the splined hub allows longitudinal movement of the splined shaft relative to the splined hub, and wherein the splined hub constrains the splined shaft to rotate with the splined hub; and
wherein the second biasing device is positioned between the splined hub and the splined shaft, and the second biasing device applies a biasing force to the splined shaft that urges the splined shaft to displace longitudinally in the splined hub, thereby creating the portion of the engagement force.

6. The valve of claim 2, further comprising a sealed volume within the valve housing, wherein the compensation piston provides pressure communication between the sealed volume and a first flow passage external to the sealed volume, and wherein the first biasing device acting on the compensation piston creates a pressure differential between the first flow passage and the sealed volume by increasing a pressure in the sealed volume by a constant amount above a pressure in the first flow passage; wherein the increased pressure in the sealed volume creates a pressure differential across the rotary actuator, thereby creating the portion of the engagement force; wherein the first flow passage is an internal flow passage of a drill string; further comprising a screen configured to filter fluid flowing from an internal flow passage of a drill string into the rotary valve, wherein the first flow passage is a chamber that is downstream from the screen; and wherein the screen creates a pressure drop across the screen when fluid flows from an internal flow passage of the drill string to the chamber such that pressure in the chamber is less than the pressure in the internal flow passage.

7. The valve of claim 1, wherein an end of the rotary actuator includes the first engagement surface, wherein the end is made from a silicon carbide diamond (ScD) composite, and wherein the engagement force maintains engagement between the first and second engagement surfaces during one or more impacts to the rotary valve; and
wherein damage to either one of the first and second engagement surfaces is prevented when contact is maintained between the first and second engagement surfaces.

8. The valve of claim 1, wherein the valve seat is made from a silicon carbide diamond (ScD) composite, and wherein the engagement force maintains contact between the first and second engagement surfaces during one or more impacts to the rotary valve; and
wherein damage to either one of the first and second engagement surfaces is prevented when contact is maintained between the first and second engagement surfaces.

9. A system for steering a drill bit with a rotary valve, the system comprising:
a downhole tool interconnected in a drill string, the downhole tool comprising;
multiple extendable pads that are activated by respective actuators, and
the rotary valve that selectively activates the actuators, the rotary valve comprising;

a valve housing,
a manifold,
a rotary actuator with a first engagement surface,
a valve seat with a second engagement surface, and
an engagement force applied to the rotary actuator, wherein the engagement force maintains engagement between the first and second engagement surfaces,
wherein at least a portion of the engagement force is created by a first biasing device acting on a compensation piston; and the drill bit interconnected at an end of the drill string, wherein the drill bit is steered due to selective extension and retraction of the extendable pads that is controlled by the rotary valve.

10. The system of claim 9, wherein at least one of the valve seat and at least a portion of the rotary actuator are made from a silicon carbide diamond (ScD) composite.

11. The system of claim 9, wherein the rotary valve further comprises a motor, and wherein the motor controls rotation of the rotary actuator and thereby the selective extension and retraction of the extendable pads;
wherein the motor is coupled to the rotary actuator via a splined shaft inserted in a splined hub, and wherein the splined shaft can move longitudinally within the splined hub.

12. The system of claim 9, wherein the engagement force is at least partially created by at least one of a second biasing device and a pressure differential across the rotary actuator.

13. The system of claim 12, wherein the rotary valve further comprises a sealed volume, wherein the first biasing device applies a compensation pressure to the sealed volume and maintains the sealed volume at an elevated pressure, wherein the elevated pressure is elevated above a flow passage pressure by the compensation pressure amount, and wherein the flow passage is external to the sealed volume.

14. The system of claim 13, wherein the sealed volume contains a motor and is filled with clean oil, and wherein the clean oil is maintained at the elevated pressure; and/or
wherein the elevated pressure of the clean oil produces at least a portion of the engagement force by creating a pressure differential across the rotary actuator.

15. The system of claim 12, wherein the second biasing device is positioned between a splined hub and a splined shaft, and wherein the second biasing device acts on the splined shaft to produce at least a portion of the engagement force; and/or
wherein fluid that enters the rotary valve from a flow passage of the drill string passes through a screen which creates a pressure drop in the fluid, and wherein this pressure drop causes a pressure differential across the rotary actuator and thereby produces at least a portion of the engagement force.

16. A method of maintaining engagement between surfaces in a rotary valve, the method comprising:
assembling a rotary valve in a downhole tool, the rotary valve comprising,
a valve housing,
a manifold,
a rotary actuator with a first engagement surface, and
a valve seat with a second engagement surface; and
applying an engagement force to the rotary actuator, thereby maintaining engagement between the first and second engagement surfaces,
wherein at least a portion of the engagement force is created by a first biasing device acting on a compensation piston.

17. The method of claim 16, wherein the rotary valve further comprises a compensation piston and a sealed volume, and wherein the compensation piston provides pressure communication between the sealed volume and a flow passage external to the sealed volume;
further comprising biasing the compensation piston with a biasing device, thereby elevating pressure in the sealed volume by a compensation pressure amount above pressure in the external flow passage; and
further comprising creating a pressure differential across the rotary actuator due to the elevated pressure in the sealed volume and producing at least a portion of the engagement force due to the elevated pressure.

18. The method of claim 16, wherein the rotary valve further comprises a drive shaft coupled to the rotary actuator via a splined shaft inserted in a splined hub, and wherein a biasing device is positioned between the splined hub and the splined shaft; and
further comprising producing at least a portion of the engagement force due to the biasing device.

19. The method of claim 16, wherein the rotary valve further comprises a screen, wherein fluid flowing through the screen creates a pressure drop in the fluid flow, and wherein at least a portion of the engagement force is produced by the pressure drop in the fluid flow; and/or
wherein applying the engagement force is performed at the surface and/or downhole in a wellbore.

* * * * *